Sept. 24, 1968 S. SAUL 3,402,835
CONTROL SYSTEM FOR A ZONED AUTOMATIC WAREHOUSE ARRANGEMENT
Filed Dec. 14, 1964 13 Sheets-Sheet 1

INVENTOR.
SANFORD SAUL
BY
Meyer, Baldwin, Doran & Egan
ATTORNEYS

Sept. 24, 1968  S. SAUL  3,402,835
CONTROL SYSTEM FOR A ZONED AUTOMATIC WAREHOUSE ARRANGEMENT
Filed Dec. 14, 1964  13 Sheets-Sheet 3

INVENTOR.
SANFORD SAUL
BY
Meyer, Baldwin, Doran & Egan
ATTORNEYS

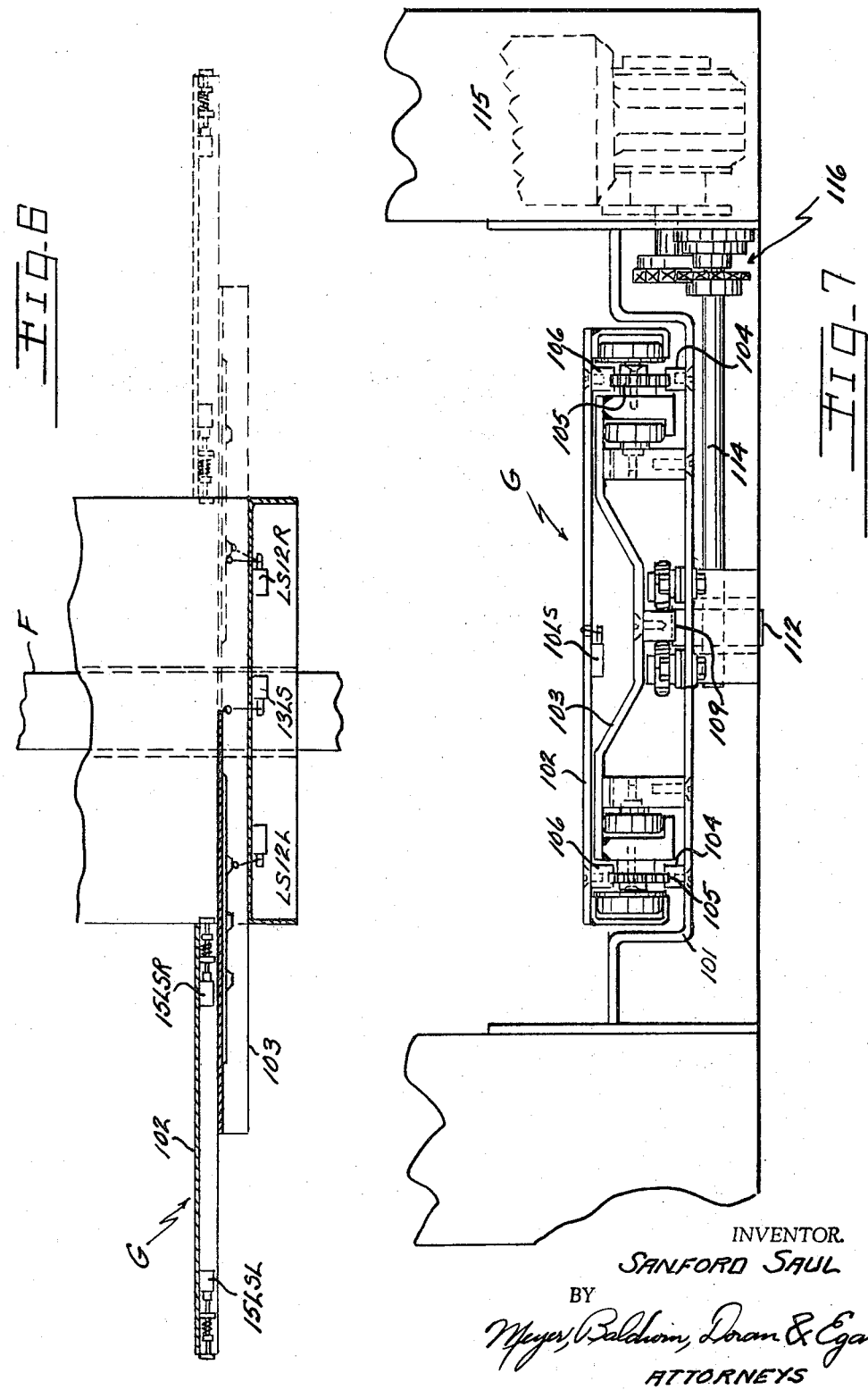

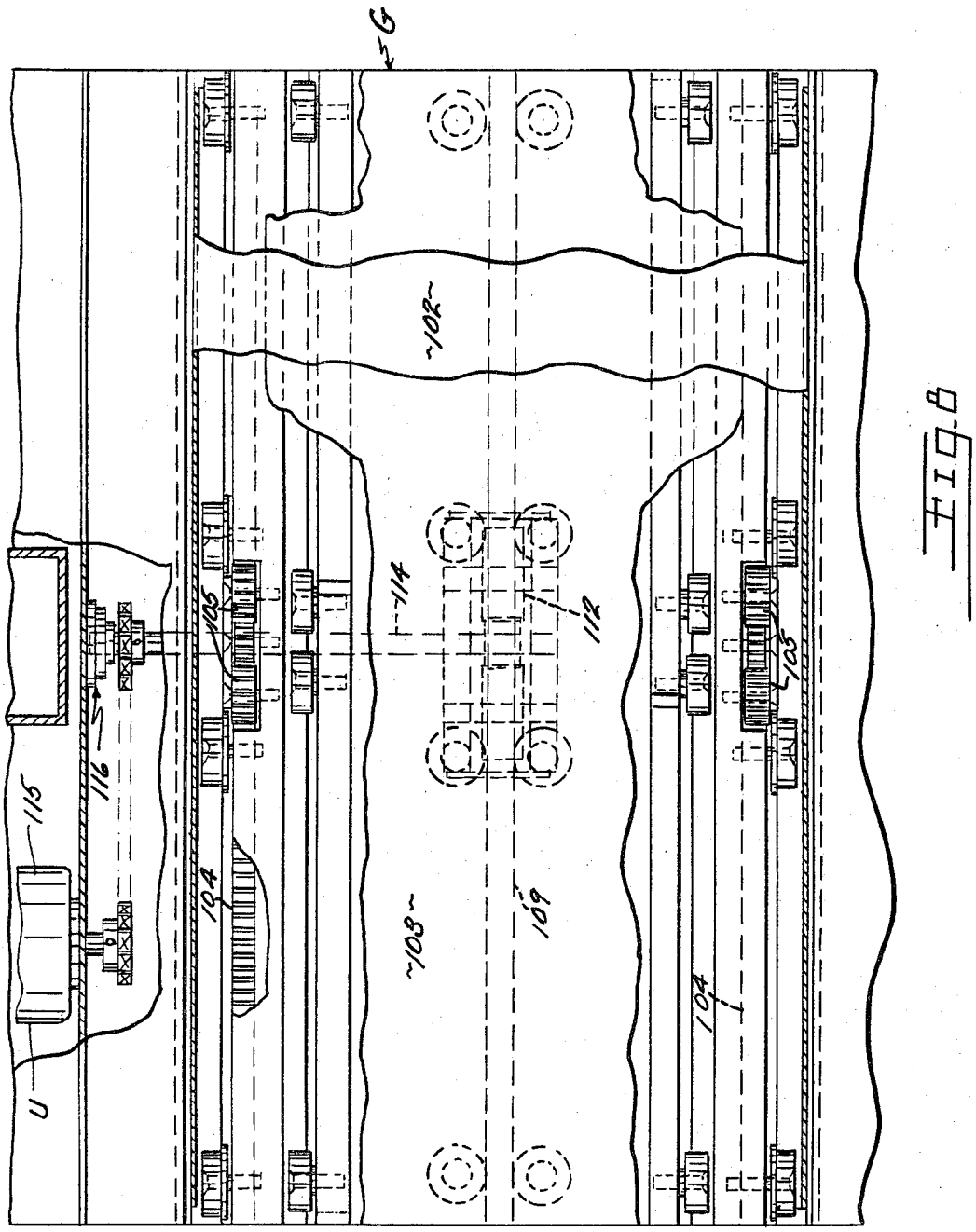

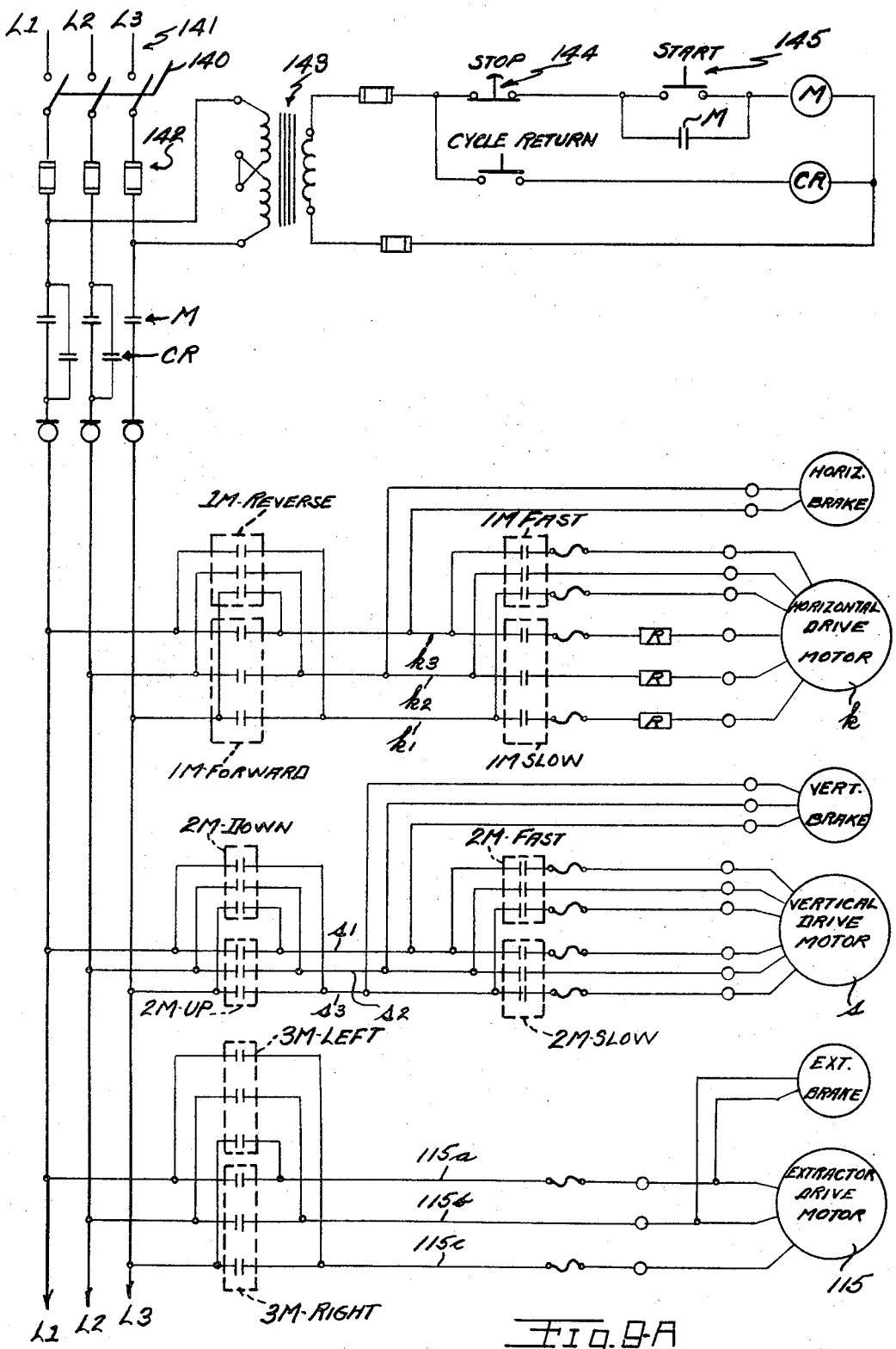
Fig. 8-A

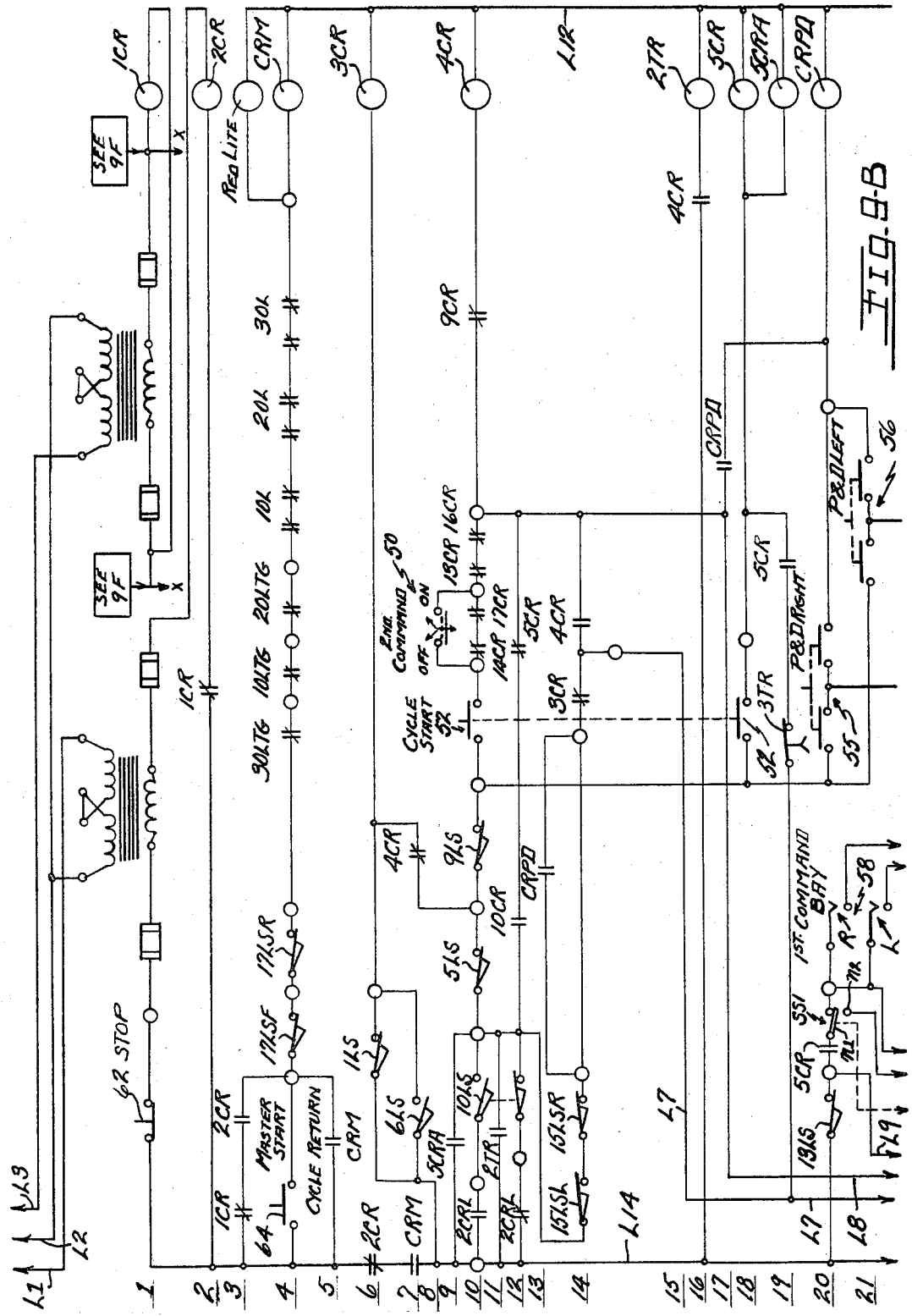

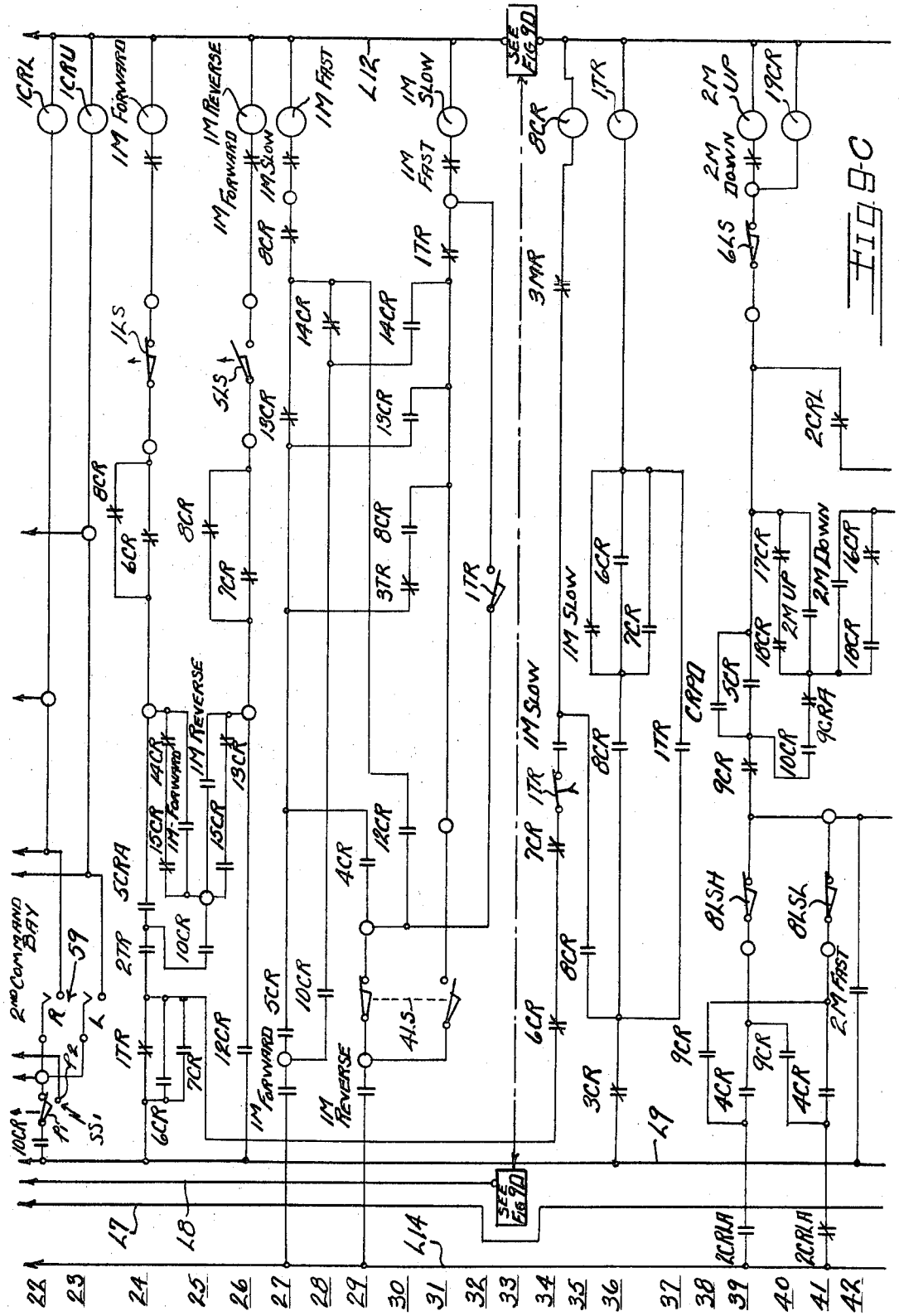

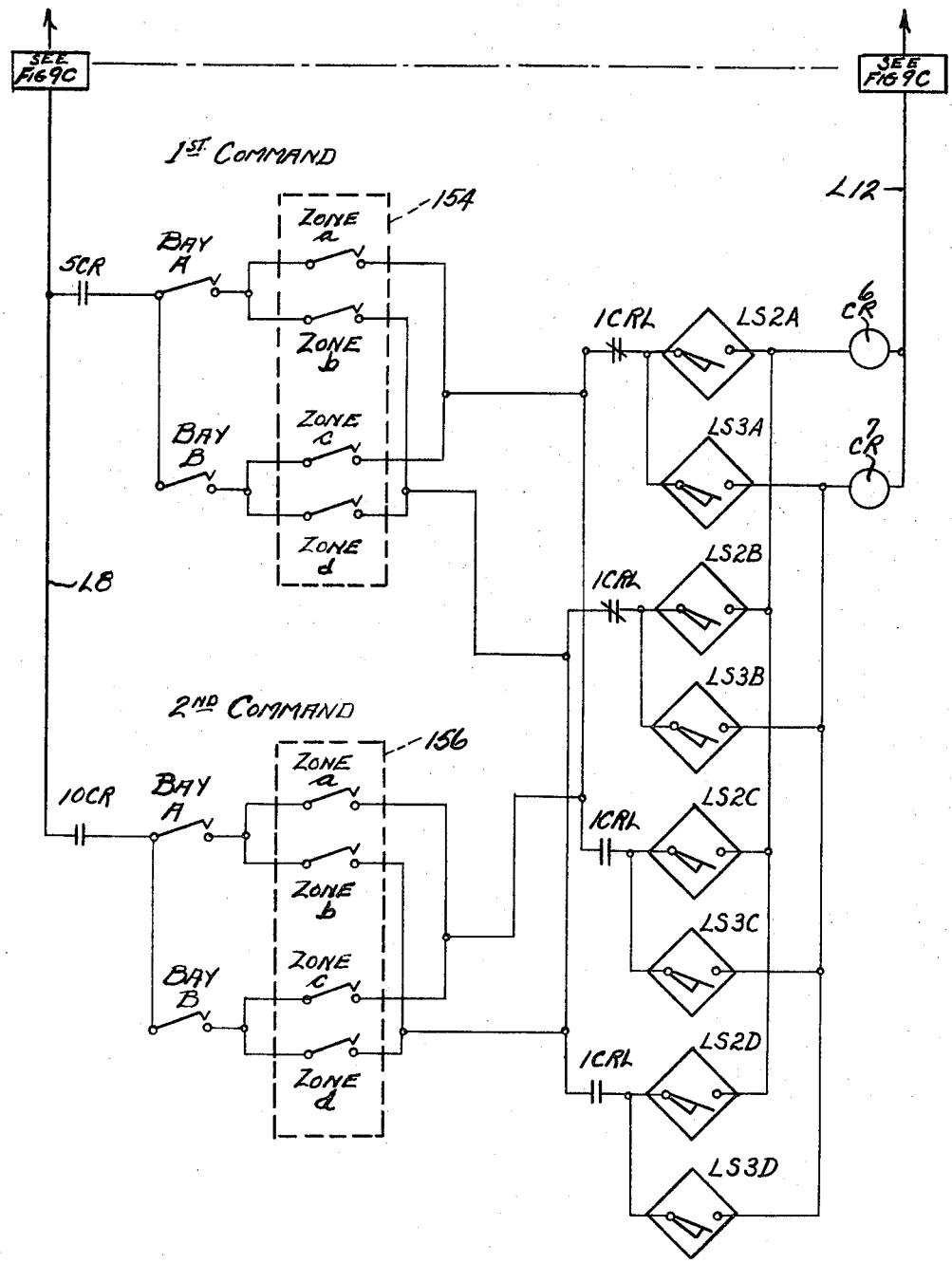
Fig. 9-D

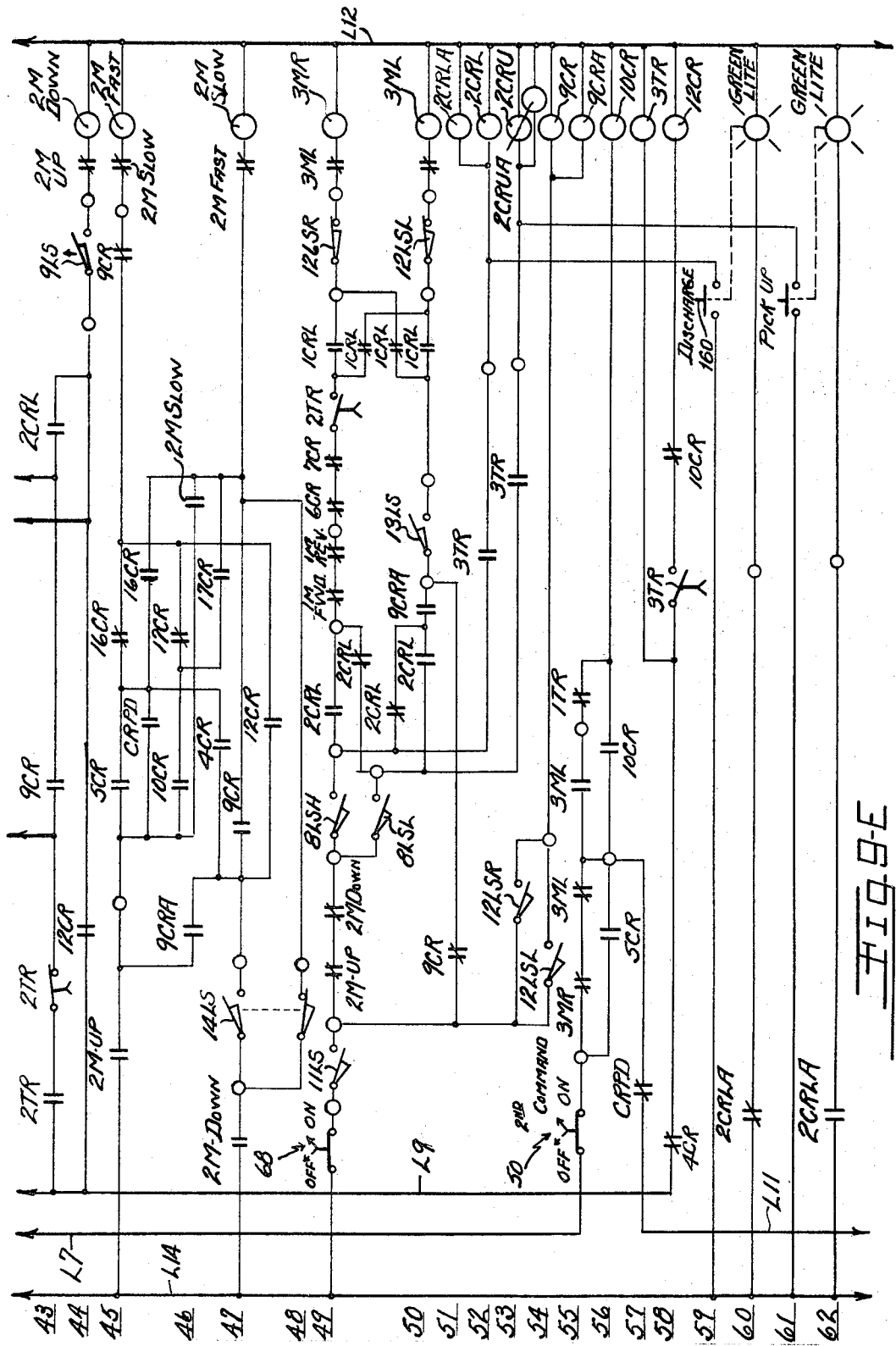

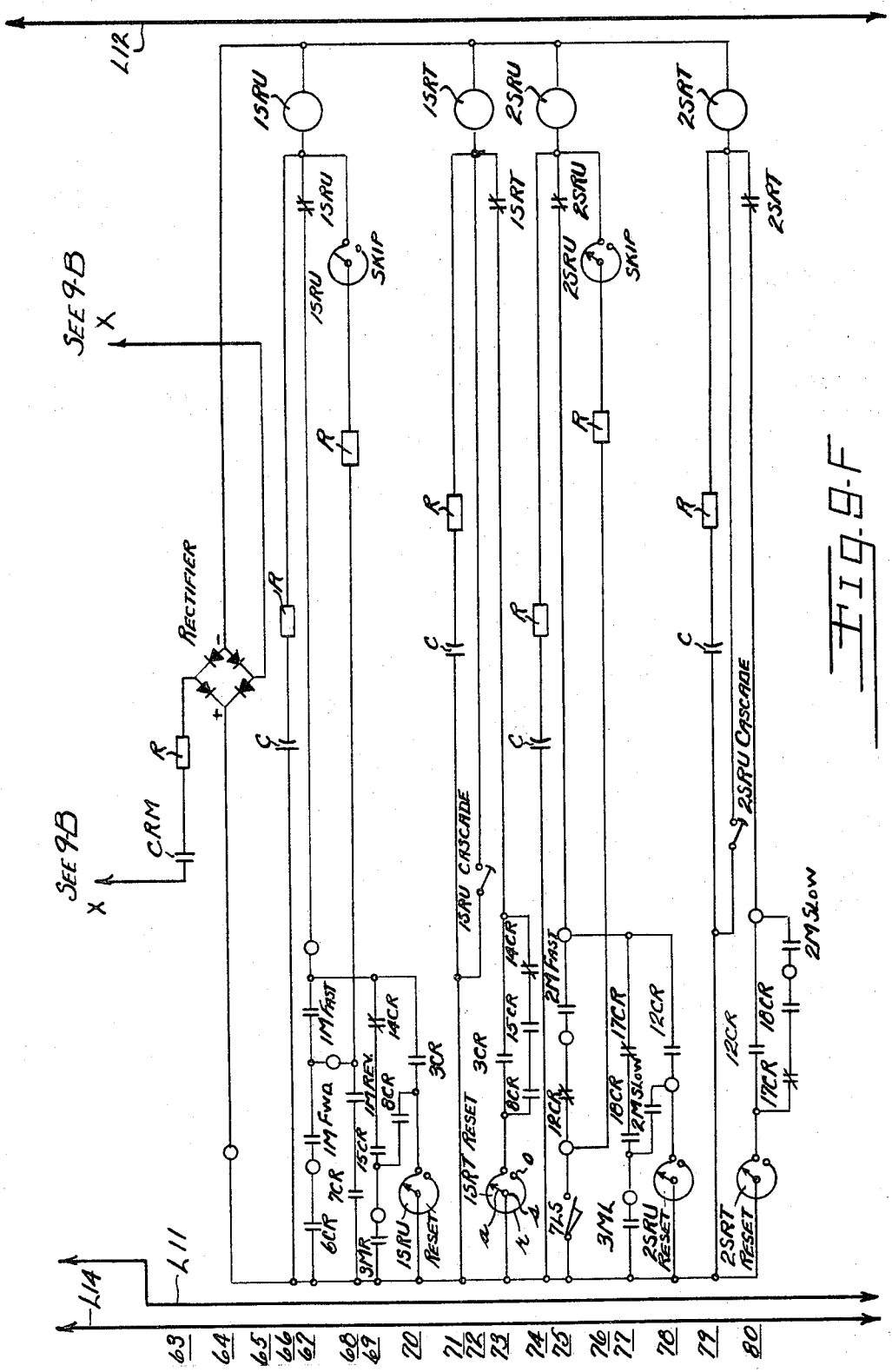

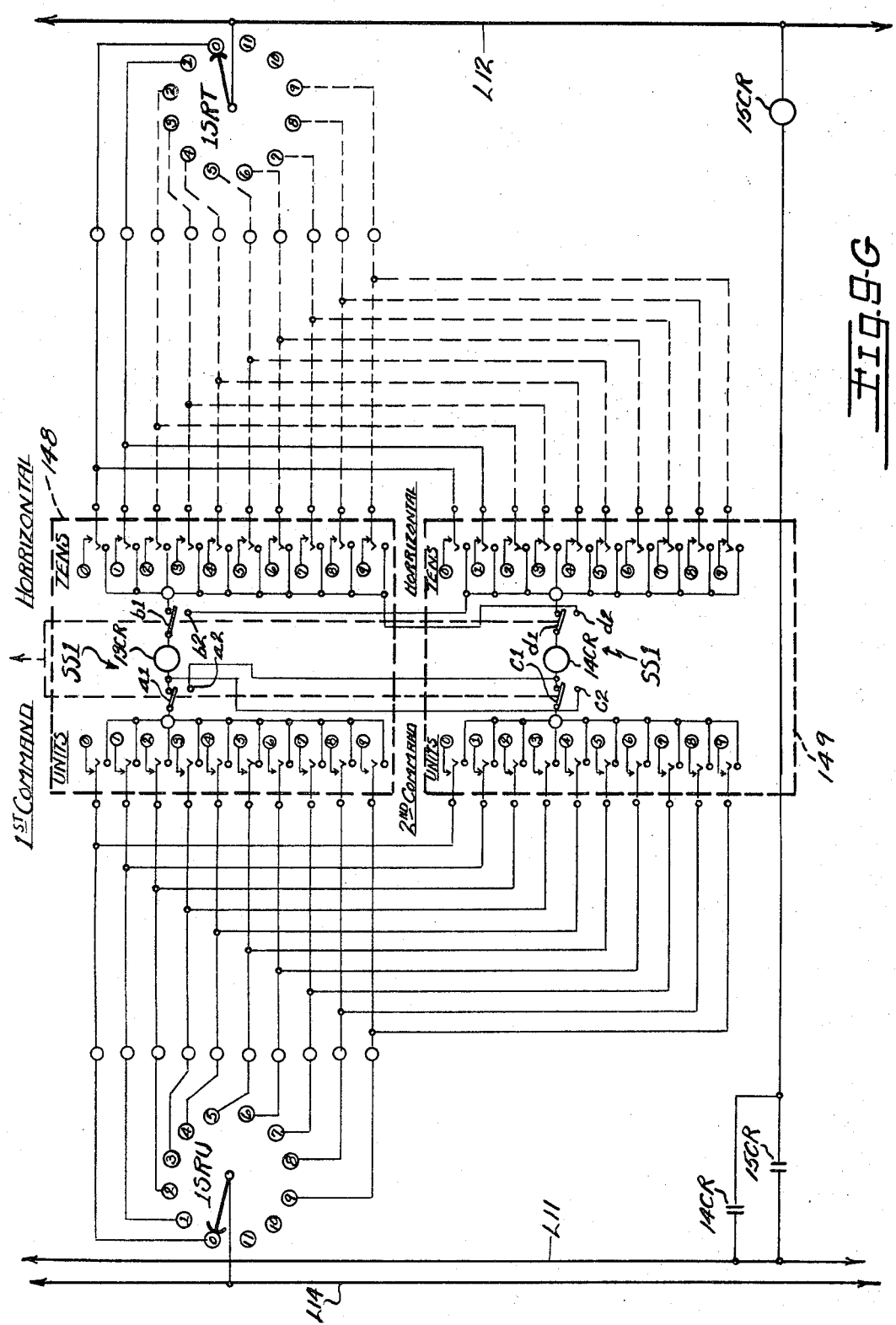

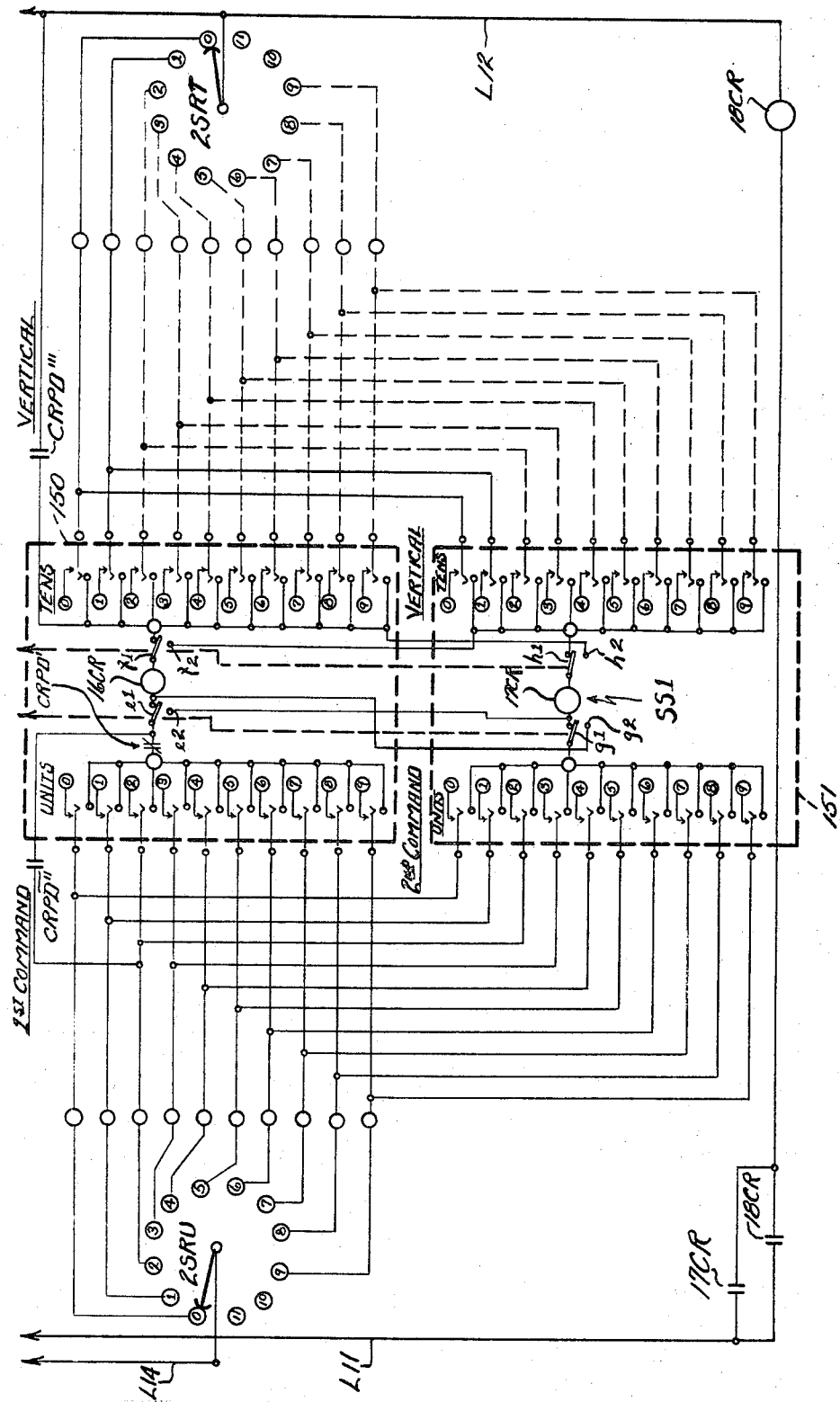

United States Patent Office 3,402,835
Patented Sept. 24, 1968

3,402,835
CONTROL SYSTEM FOR A ZONED AUTOMATIC
WAREHOUSE ARRANGEMENT
Sanford Saul, Cleveland, Ohio, assignor to The Triax
Company, Cleveland, Ohio, a corporation of Ohio
Filed Dec. 14, 1964, Ser. No. 418,048
11 Claims. (Cl. 214—16.4)

ABSTRACT OF THE DISCLOSURE

An electrical control system for controlling the movement of an article conveyor in an automatic warehouse apparatus wherein the storage racks of the apparatus are divided into discrete zones with means therein in which the article conveyor is responsive to during its movements. The system is operative to accommodate for any irregularities, such as sagging, that may occur in the rack structure that would hinder the proper positioning of the article conveyor at a predetermined location in the warehouse.

---

This invention relates to an electrical control circuit especially designed for use with an automatic warehousing system which utilizes article conveying apparatus for dispensing articles into and from a storage area and wherein the electrical control circuit is operable to provide a predetermined storage or dispensing program whereby the conveying apparatus completes a plurality of dispensing and/or storage movements without intervening manual attendance and control.

A primary object of the present invention is to provide a new and improved electrical control circuit for use with article conveying apparatus in an automatic warehousing system and wherein a dispensing program may be provided for the said conveying apparatus whereby it may be automatically controlled and movable to a plurality of load storage and/or dispensing positions in the warehousing system.

Another object of the present invention is to provide a new and improved electrical control system for use in an automatic warehousing system which utilizes an article conveyor and wherein the electrical control circuit may be programmed to enable the said conveyor to move sequentially to a plurality of load dispensing and/or storage positions without intervening manual control.

Still another object of the present invention is to provide a new and improved electrical control circuit for use in an automatic warehousing system which utilizes an article conveyor wherein the electrical control circuit is programmed to enable the conveyor to convey articles to a plurality of load dispensing and/or storage positions in said warehousing system without intervening manual control and further wherein the said electrical control circuit includes sensing means operable to indicate the location of the article conveyor within the warehousing system to assure the proper disposition of the article carried thereon in said system.

Another object of the present invention is to provide an electrical control circuit as above defined and which, in addition, is operable to accommodate for any irregularities that may occur in the storage bin structure such as, for example, the vertical plumb of the storage racks or the conveyor structure so as to enable the article conveyor to be properly located at the dispensing and storage positions in said system.

Additional objects and advantages of the electrical control circuit of the present invention will be apparent to one skilled in the art to which it pertains and upon reference to the following description of a preferred embodiment thereof and which is illustrated in the accompanying drawings wherein:

FIG. 6 is a fragmentary end view of the carriage of the article conveyor showing the extensible table thereof in several of its actuated positions;

FIG. 7 is a side view of the carriage table showing the upper and lower table sections thereof and the mechanism for extending and retracting said table sections;

FIG. 8 is a fragmentary plan view of the article carriage; and

FIGS. 9A–9H are schematic wiring diagrams illustrating a preferred embodiment of electrical control circuit of the present invention.

Figure 1:
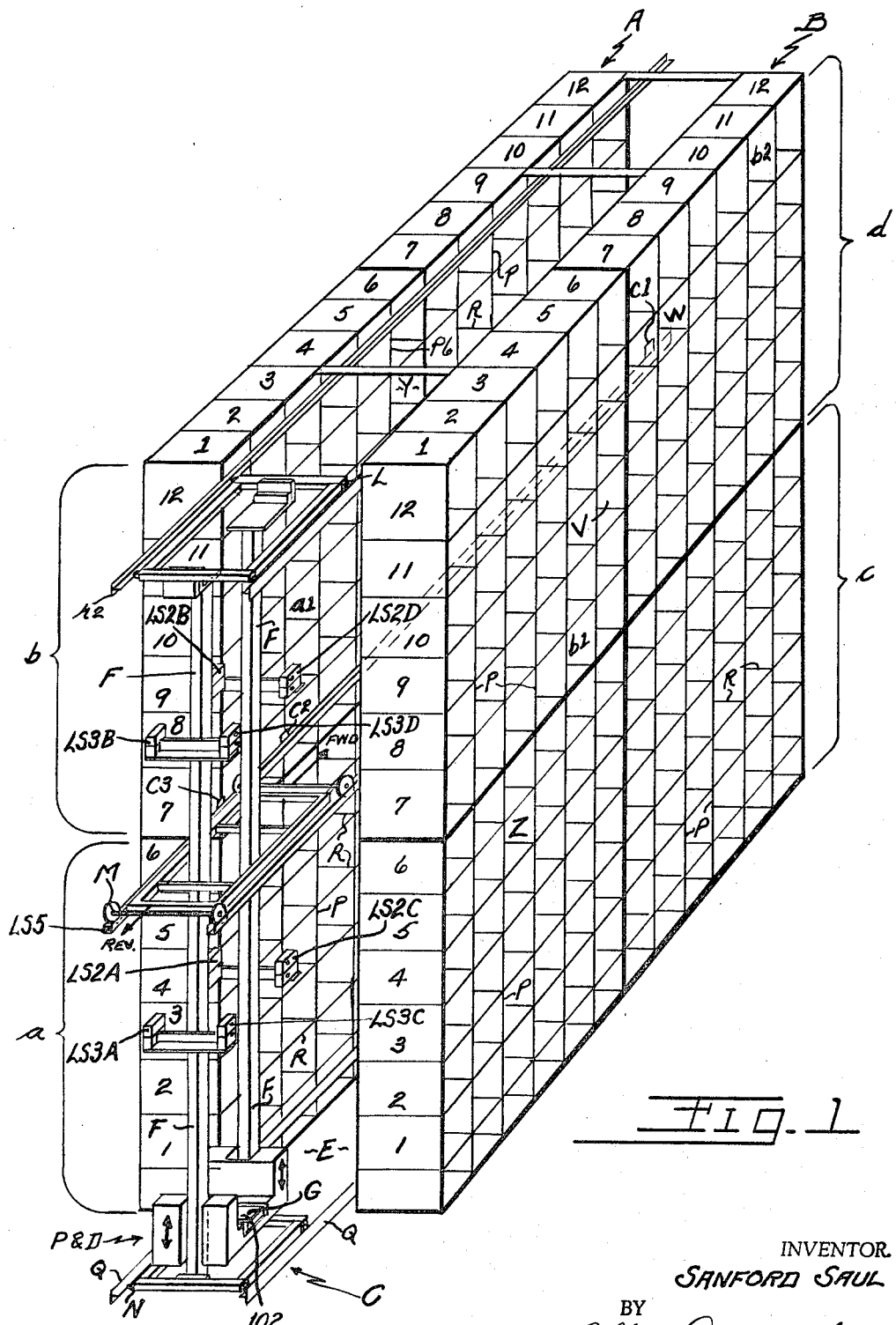
FIG. 1 is a diagrammatic perspective view of a typical storage installation utilizing an automatic warehousing system embodying the electrical control assembly of the present invention.

Referring now to the drawings, the automatic warehousing system to which the electrical control circuit of the present invention is particularly applicable, is generally of the type that is disclosed in the assignee's copending application Ser. No. 373,803, and which is schematically illustrated in FIG. 1 hereof to include a pair of upright storage bays A and B which are spaced a predetermined distance apart to define an aisle E therebetween so as to permit an article conveyor as indicated generally at C to be moved therein to insert and/or withdraw articles from the storage bins formed therein.

Figure 5:
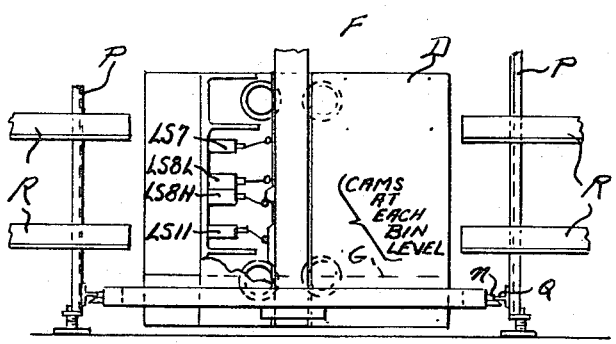
FIG. 5 is a fragmentary end view of the article conveyor.

As shown particularly in FIGS. 1 and 5, each bay is constructed, in its instant embodiment, of a plurality of vertically extending posts P spaced apart by a plurality of horizontally extending rails R defining a plurality of storage bins.

The electrical control circuit is intended to control the movement of the article conveyor C in such manner as to enable said conveyor to be automatically programmed to move through two load dispensing and/or storage positions without intervening human assistance.

For example, with an article placed upon the conveyor C, said article may be conveyed to and deposited within a first bin such as bin $a_1$ located in storage bay A, and another article may be subsequently withdrawn from a second bin, for example $b_1$ located in storage bay B and conveyed to the initial starting position for the conveyor for withdrawal from said storage area which position as is shown in FIG. 1 may also be hereinafter referred to as the load and discharge position or station (L and D) for said article conveyor.

Likewise, the article conveyor C may be programmed by the instant control circuit so that it may be moved to a bin such as bin $a_1$ to withdraw an article therefrom, and then moved to a second bin $b_1$ whereat said article is re-deposited in storage bay B.

As will also be hereinafter more fully apparent, the movement of the article conveyor C may be programmed so that it may be first located opposite any one of the bins in storage bay A or B, and subsequently opposite any one of the bins in the same or the opposite storage bay.

Figure 2:
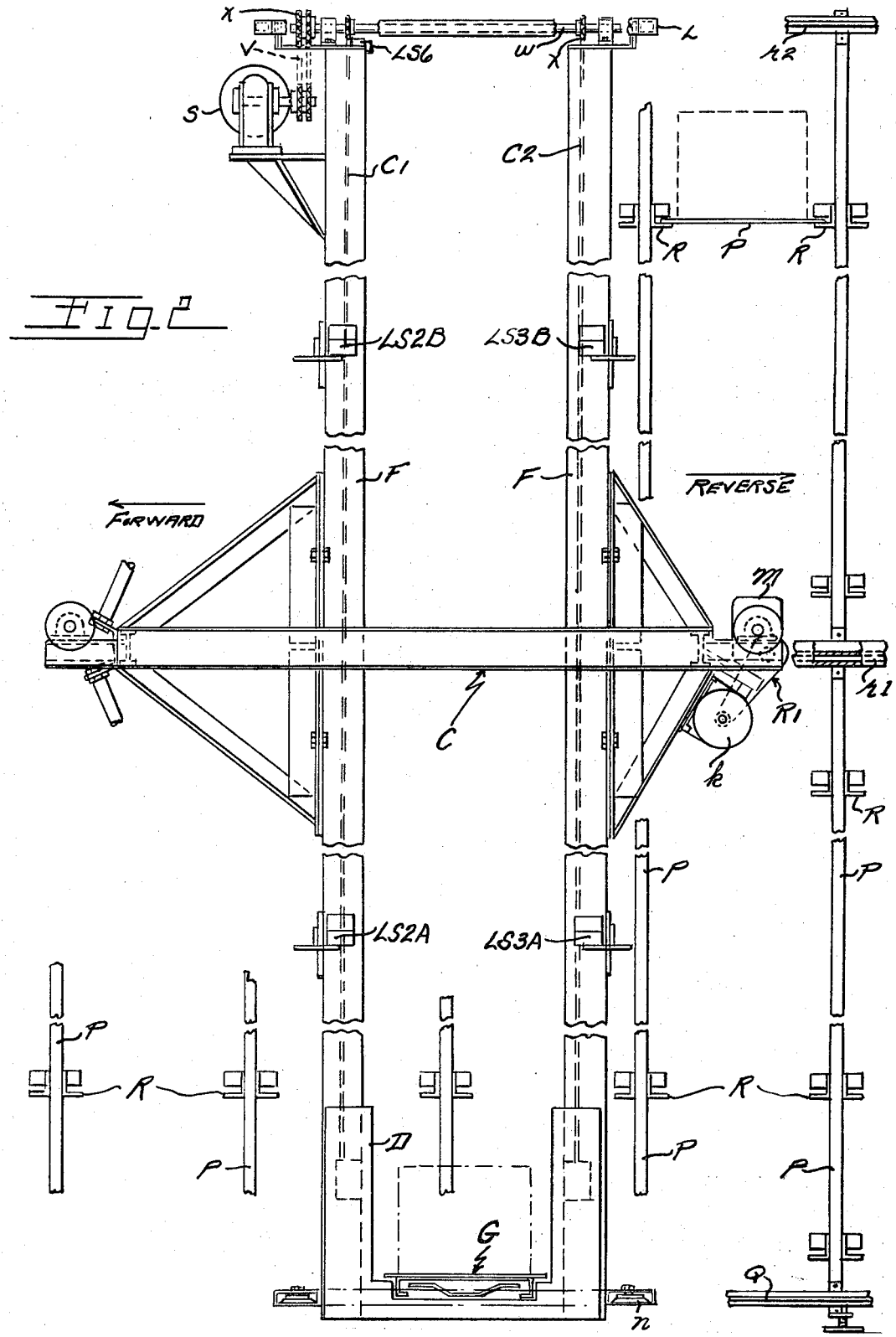
FIG. 2 is a side view in elevation of the article conveyor in the warehousing system of FIG. 1.

As best seen in FIGS. 1 and 2 the aisle sides of the storage bays A and B are each provided with pairs of rails $r_1$, $r_2$, respectively, defining tracks which provide for supporting the article conveyor C as it is moved therealong within the aisle E. Rails $r_1$ are seen to extend horizontally along said bays A and B, preferably closely adjacent the top thereof while rails $r_2$ are similarly mounted at a suitable elevated position therealong.

The conveyor C comprises an upright mast formed with a pair of vertically extending track members F upon which an article carriage G is movably supported. The conveyor mast is suspended from the rails $r_1$ and $r_2$ by means of pairs of wheels L and M suitably carried on the track members, preferably at the upper ends thereof and at a suitable intermediate level therealong.

The lower end of each track member F carries a roller N which is intended to ride upon the center web of a T-shaped rail Q mounted on the aisle side of each storage bay A and B, preferably closely adjacent the bottom thereof whereby it supports the conveyor as it is moved along the aisle E to thus provide a three point suspension therefor.

The article conveyor C is moved through the aisle E by means of a suitable drive means which includes a reversible electric motor $k$ drivingly connected by a belt and gear drive $R_1$ to the drive wheels M whereby said conveyor may be reversibly conveyed along the aisle E and between the upright storage bays A and B.

For purposes of the present disclosure, movement of the conveyor C to the right along aisle E as viewed in FIG. 1 will be described as into the storage area, and movement in the opposite direction or to the left will be referred to as movement out of the storage area.

As best seen in FIG. 1, the rails $r_1$, $r_2$ and Q extend outwardly of the aisle E to enable the article conveyor C to be located immediately in front of the storage racks A and B at its load and discharge station.

The article carriage G is likewise selectively raised and lowered on the supporting track members F by a drive comprising reversible electric motor S which is drivingly connected by a suitable chain and sprocket drive V to a shaft W. The shaft W is seen to mount sprockets X over which endless chains are reeved such as indicated at $c_1$ and $c_2$, one end of each of said chains being attached to the article carriage G, the opposite end of said chain preferably hanging free along the track adjacent thereto.

With this assembly, upon energizing the motor S, the article carriage G may be raised and/or lowered upon the supporting track members F.

With the article carriage G positioned opposite a preselected storage bin in either of the storage bays A and B, said carriage is then actuatable to deposit an article carried thereon into said bin and/or to remove an article therefrom.

To accomplish this, the article carriage G, as best seen in FIGS. 6, 7 and 8, is seen to comprise a platform 101 which carries an extensible table formed of two substantially rectangular table sections, an upper section and a lower section, 102 and 103 respectively, which are supported one above the other. The table is extensible in either of two opposed directions so as to locate the upper table section 102 within either of the storage bays A or B effective to place the same in position to deposit or remove an article from one of the storage bins.

As best seen in FIG. 7, a pair of racks 104 are attached to the upper face of the platform 101, and are intended to mesh with gears 105 rotatably carried on the lower table section 103.

Racks 106 are similarly mounted on the underside of the upper table section 102 and likewise mesh with the opposite side of gears 105.

A rack 109 is carried on the underside of the lower table section 103, preferably extending longitudinally centrally thereof, and is intended to mesh with drive pinion 112 attached to the end of shaft 114 rotatably supported on the aforesaid platform 101.

A reversible electric motor 115 is drivingly connected by a suitable chain and sprocket drive 116 to shaft 114.

With this construction, upon energizing motor 115 the extensible table sections are projected outwardly to a position such as is disclosed in FIG. 6 to either side of the platform wherein the upper table section may be located within a storage bin.

Figure 3:
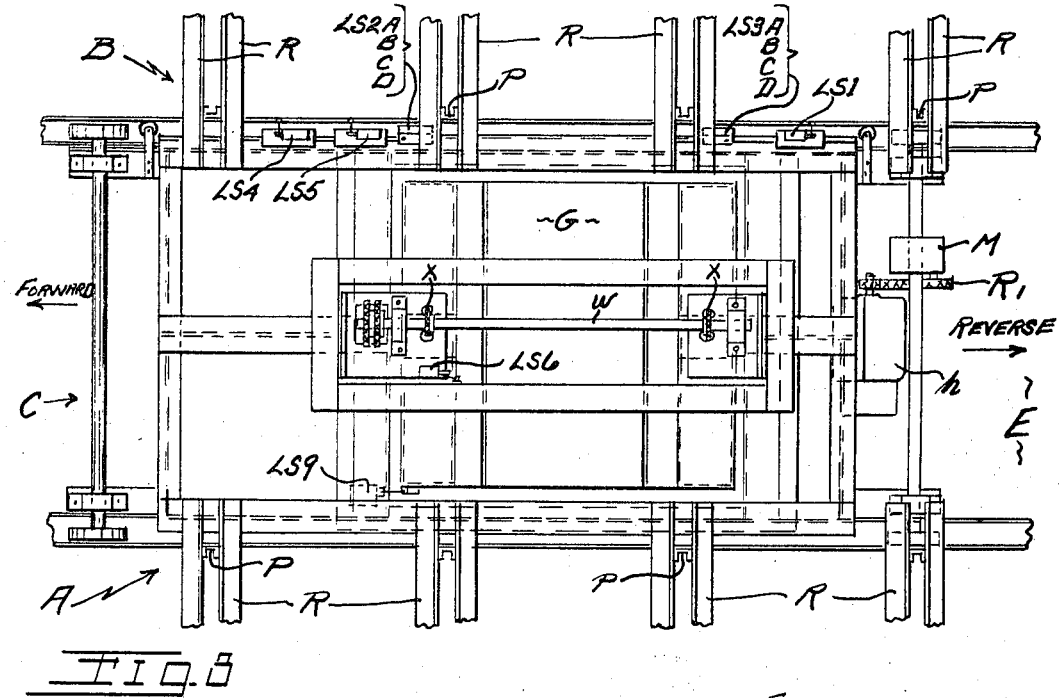
FIG. 3 is a fragmentary plan view of the article conveyor of FIG. 2 and illustrating a part of the storage bays of the storage installation.

In a manner as will be hereinafter more fully explained, when depositing an article into one of the storage bins, the article carriage G is located opposite the bin opening such that as the article is moved into the storage bin the upper table section 102 is slightly above the article supporting members R in the form of angles mounted on the sides of the bin as seen in FIG. 3. And, with the article completely in said bin, the carriage G is then lowered slightly so as to deposit the article pallet $p$ onto said supporting members R and to permit the retraction of the upper and lower table sections 102 and 103 to their stacked position such as is shown therefor in FIG. 1.

Conversely, when it is desired to remove an article from a bin, the carriage G is located such that as the upper table section 102 is extended into the bay it is slightly below the article supporting pallet $p$. Thereafter, the carriage G is raised so as to lift the article pallet off its supporting angles R and said table is then retracted to its stacked position preparatory to moving the conveyor C to its next station.

In review, the programmed operation for the article conveyor C is to be controlled by the electrical control circuit, yet to be described, whereby with the article carriage G disposed at its "load and discharge" station as shown in FIG. 1, said conveyor C may then be automatically moved into the aisle E and located sequentially opposite two storage bins in either or the same storage bay A or B. At each storage bin during this control interval, the carriage G is actuated so that an article may be deposited or withdrawn from the bin. For example, an article may be deposited into the bin at the first position and a second article withdrawn from the bin at the second position and conveyed to the aforesaid article load and discharge station, or a first article may be withdrawn from the bin at the first position and re-deposited into the bin defining the second position and the carriage G returned to the aforementioned load and discharge station (L and D).

To control the movement of the article conveyor C in the manner just described, the control circuit of the present invention is connected thereto so as to program the operation of the conveyor motors $k$ and S, and the carriage motor 115.

For this purpose and with reference now directed to the control circuit as illustrated in FIGS. 9A–9H; the various components of said circuit are shown in the "at rest" condition therefor with the article conveyor C and carriage G disposed at the article "load and discharge" station as shown in FIG. 1 and with "no load" deposited on the conveyor table 102.

A plurality of switching components of said control circuit are mounted on the conveyor C and on the storage bays A and B, and are responsively coupled between the article conveyor and carriage and the remaining control elements of said control circuit to sense the presence of the article conveyor at said station and/or its movement through the aisle E so as to control or program its cyclic conveyance through said storage area.

As best seen in FIG. 3, one of the switching components identified as LS1, is mounted on the article conveyor C so as to engage an abutment $c_1$ on one of the rails $r_1$, $r_2$ effective to actuate said component. Switch LS1 is preferably a conventional limit switch having a manually-open contact and a manually-closed contact. As will be hereinafter described in detail, switch LS1 is positioned on the conveyor C and is actuated as said conveyor moves to a predetermined forwardmost position within the aisle E so as to prevent overtravel of said conveyor.

Switching components LS2 A, B, C and D and LS3 A,

B, C and D are likewise carried on the article conveyor C as shown in FIGS. 1 and 3 and are each preferably of the type conventionally referred to as a "proximity switch" such as the Model 43–100D switch of the General Equipment & Mfg. Co. of Louisville, Ky.

As will be hereinafter described, the proximity switches LS2 A–D and LS3 A–D control the horizontal movement and positioning of the article conveyor C within the storage aisle E.

In storage installations of substantial vertical height, it has been found that the bay assembly may have a tendency to lean or bow from top to bottom wherein the article conveyor may be properly aligned with a bin opening near the bottom of the bay, but not properly aligned with a bin opening in the same bin column near the top of the bay. Likewise, the conveyor mast assembly may have a tendency to lean to thereby introduce still additional misalignment between said conveyor, its carriage and the storage bays A and B.

To compensate for said structural misalignments, the proximity limit switches LS2 A–D and LS3 A–D are grouped in pairs and then assigned to control the horizontal movement and positioning of the conveyor in predetermined zones set up within the storage bays A and B.

As seen in FIG. 1, the storage bays A and B each have, by way of example, twelve (12) rows of storage bins stacked one upon the other, each row, in turn, having twelve (12) bins; said structure thus defining twelve (12) bin columns and twelve (12) bin rows in each bay. Storage bay A is seen to be divided into two zones $a$ and $b$, zone $a$, by way of example, being the lower half of the bay and zone $b$ being the upper half of the bay. In like manner, bay B is divided into two zones $c$ and $d$, zone $c$ being the lower half and zone $d$ being the upper half.

As will hereinafter be apparent, the storage bays may be of various configurations and divided into any selected lesser or greater number of zones.

Proximity switches LS2A and LS3A are paired together and function to control the horizontal positioning of the conveyor in lower zone $a$ of bay A; switches LS2B and LS3B control the horizontal positioning of the conveyor $c$ in upper zone $b$ of bay A; switches LS2C and LS3C function similarly in lower zone $c$ of bay B and switches LS2D and LS3D in upper zone $d$ in bay B.

As shown in FIG. 1, each proximity switch pair is preferably suitably mounted on the conveyor mast F so as to be in a position to scan or sense the bay in approximately the center of its respective bay zone. In this manner, each proximity switch pair is able to provide a zone positioning control for the conveyor C whereby said conveyor is properly centered in the opening of each bin that is preselected as the load dispensing positions during the dispensing cycle.

As will also be later apparent, for high storage bay structure it may be desired to use a greater number of proximity switch pairs which may be similarly located on the conveyor mast F and thus operable to provide comparable zone positioning control.

A limit switch identified as LS4 is likewise carried on the article conveyor C as best seen in FIG. 3 and, as will later be explained in detail, is operable upon engaging a cam abutment $c_2$ (FIGURE 1) near the load and discharge station to reduce the speed of the conveyor as it returns to its "pickup and discharge" station.

Limit switch identified as LS5 as also seen in FIG. 3 is operable upon engaging a cam abutment $c_3$ (FIGURE 1) on the rail $r_1$ at the load and discharge station to indicate that the article conveyor C is at its "pickup and discharge" station and thus properly positioned for the next subsequent article dispensing cycle.

Limit switch LS6 is carried on the conveyor mast as seen in FIG. 2, and is operated by the article carriage G in the event said carriage is raised too high within said mast whereby the carriage drive means is effectively disconnected from its power source to stop the vertical rise of said carriage.

Limit switch identified as LS7 in FIG. 5 is likewise carried on the article conveyor C and is operated each time the carriage G is raised to another bin level and thus utilized to provide a vertical count for the conveyor C.

Limit switch LS8L and LS8H are also carried on the article conveyor C and are individually operable to properly position the article carriage G with respect to a particular bin opening so as to permit an article to be removed from or deposited into said bin.

Figure 4:
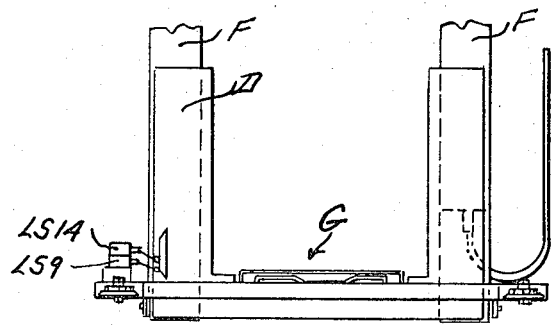
FIG. 4 is a fragmentary side view of the article conveyor.

Limit switch as defined as LS9 is carried on the aforesaid conveyor mast and is operable to stop the movement of the article carriage G as it reaches its "down" position as seen in FIG. 4.

Limit switch identified in FIG. 7 as LS10 is carried on the carriage table 102 and is operable to indicate the presence or absence of an article on said table.

Limit switch identified in FIG. 5 as LS11 is mounted on the article conveyor C and is utilized to prevent the article carriage G from being moved opposite another bin opening while its carriage table 102 is already projected into a previously selected storage bin.

Limit switch elements LS12L, LS12R and LS13, as seen in FIG. 6, are mounted on the article carriage G, and are operable to indicate the extension of the table 102 to the left or right and the return of the said table to its center position, respectively.

Limit switch element LS14, as seen in FIG. 4, is carried on the conveyor mast preferably adjacent switch LS9 and is operable to decrease the speed of the article carriage G as it approaches its "down" position.

Limit switch components identified in FIG. 6 as LS15L and LS15R are carried on the opposite ends of the extensible table 102 of the article carriage G, and are operable to sense the presence of a load or article already stored in a storage bin to which another article in said carriage G is erroneously conveyed and attempted to be deposited therein.

As seen in FIG. 9A, the instant control circuit is seen to be connected through a disconnect switch 140 to a conventional three phase, sixty cycle source of electrical energy as indicated at 141, each phase of the input of of which is preferably fused as at 142.

A suitable step-down transformer 143 has its primary connected across input power lines $L_1$ and $L_3$ of said source and one side of its secondary is connected to a normally closed, push-button type Stop switch 144, said switch being connected serially with a normally open, push-button type Start switch 145.

The opposite end of Start switch 145 connects to the coil of a relay M, the opposite end of said coil connecting with the opposite end of the secondary of transformer 143. Each line of the secondary is likewise preferably fused.

A normally open contact of relay M (FIG. 9A) is seen to be connected across the contacts of the Start switch 145 to define a lock circuit the function of which will be later described.

A normally-open contact of relay M is also connected in series into each power line $L_1$–$L_3$ (FIGURE 9A), and in turn connect with a conventional collector carried on the conveyor mast whereby to enable a three cable connection to the conveyor and thus afford free movement of the conveyor C within the aisle E as will be understood.

The drive motor $k$ which drives the conveyor C horizontally through the aisle E is seen to be connected by line conductors $k_1$–$k_3$ across the power lines $L_1$–$L_3$, and a normally-open contact of a forward drive relay 1M Forward is connected serially into each line conductor $k_1$–$k_3$. For reversible actuation of said motor a normally-open contact of a reverse drive relay 1M Reverse is connected serially between line conductors $k_1$ and $k_3$ effective when closed to reverse said conductor connections.

The drive motor $k$ is preferably a two-speed motor, its low speed line conductors each having a resistance R and a normally-open contact of a slow speed relay 1M Slow in series therewith. The fast speed line conductors of said motor $k$ likewise each have a normally-open contact of a fast speed relay 1M Fast connected in series therewith.

The motor $k$ is also provided with a normally engaged brake, preferably of the electromagnetic type, which is connected across line conductors K2 and K3 whereby upon energizing said motor the brake is likewise energized to its release position.

The drive motor S used to propel the article carriage G vertically reversibly along the conveyor mast assembly is connected by its line conductors $S_1$–$S_3$ across the primary power lines $L_1$–$L_3$, a normally-open contact of an upward drive relay 2M Up being connected serially into each line conductor. For reversible actuation of said motor to propel the article carriage G in a downward direction, a normally-open contact of a down drive relay 2M Down is connected serially between line conductors $S_1$ and $S_3$ effective when closed to reverse said conductor connections and effectively reversibly energize the drive motor S.

Motor S is likewise preferably a two-speed motor, its low speed line conductors each having a normally-open contact of a slow speed relay 2M Slow connected serially therewith and its fast speed line conductors being similarly connected each with a normally-open contact of a fast speed relay 2M Fast.

Motor S is also provided with a normally engaged electromagnetic brake which is connected across line conductors $S_1$–$S_3$ whereby upon energizing said motor the brake is likewise energized to its release position.

Drive motor 115 is operable, as aforementioned, to extend the carriage table 102 in either of two opposed directions, and as seen in FIGURE 9A, its line conductors 115a–115c are connected across primary power lines $L_1$–$L_3$, each of said line conductors having a normally-open contact of a relay 3M Right connected in series therewith. As will be later seen upon closing said relay contacts the drive motor 115 is energized effective to propel the carriage table 102 in a direction to the left as viewed in FIG. 6. Likewise, normally-open contacts of a relay 3M Left connected serially between line conductors 115a and 115c are effective when closed to reverse said conductor connections and provide for reversibly energizing motor 115 so as to propel the carriage table 102 in the opposite direction.

Assuming that the article conveyor C and its carriage G are disposed at the "load and discharge" station as is shown in FIG. 1, and it is desirable to program the movement of the conveyor along the asile E automatically through two article dispensing positions such as, for example, bin $a_1$ in bay A and bin $b_1$ in bay B, the electrical control circuit is programmed by the operator whereby the conveyor is automatically sequentially moved to its first position and then to its second position and thereafter returned to the "load and discharge" position, said movement being accomplished without intervening assistance.

To accomplish this, a plurality of manually settable controls are provided for the operator to manipulate which enables the control circuit to automatically sequentially program the movement of the article conveyor as just described.

As seen in FIG. 9G, the operator settable controls include a group of normally open push button switches identified at 148 which are operable to program the horizontal movement of the article conveyor C as it is moved to the first article dispensing position such as, for example, bin $a_1$ in bay A. As herein shown the switch group 148 comprises, in its present embodiment merely by way of example, two rows of normally open push button type switches numbering from 0 to 9, the left row being identified as the "Unit" row and the row on the right being identified as the "Tens" row.

Each switch, or a combination of switches in groups 148, represents a particular column of bins spaced in a horizontal direction along aisle E from the "load and discharge" station for the conveyor C.

Switch No. 5 in the "Unit" row represents the fifth vertical column of bins in either bay as, for example, the column containing bin $b_1$ located in bay B as seen in FIG. 1.

In like manner, the combination of the No. 1 switch in the "Tens" row and the No. 1 switch in the "Units" row represents the eleventh vertical column of bins in either bay as, for example, bin $b_2$ as shown in FIG. 1 in the horizontal direction as shown in FIG. 1.

The swtich bank identified in its entirety at 149 in FIG. 9G is preferably identical to the switch bank 148 and is similarly utilized to program the horizontal actuation of the article conveyor C from the first to the second article dispensing position and then back to the load and discharge station.

As is aforementioned, the article carriage G is reversibly vertically actuatable along the conveyor mast and similar switch groups 150 and 151 as seen in FIG. 9H, are utilized to program the vertical movement of said carriage so as to position the same opposite a particular bin in the selected bin column at the first and second article dispensing positions respectively.

For example, switch No. 7 in the "Units" switch row of either group 150 or 151 represents the seventh row of bins in either bay A or B such as the row in bay B containing bin $b_1$.

In like manner, the combination of the No. 2 switch in the "Units" row and the No. 1 switch in the "Tens" row represents the twelfth row of bins in either bay A or B such as the row containing bin $b_2$.

To automatically sense the actuated switch or switches in groups 148 and 149, a stepping switch identified in FIG. 9G as 1SRU and which is preferably of the unidirectional type, has its stationary contacts numbered 0–9 each connected to a correspondingly numbered depressible contact of the "Unit" row of switches of said group 148, the stationary contacts of said stepping switch being likewise connected in parallel with the correspondingly numbered depressible contacts (0–9) of the "Unit" row of switches of switch group 149.

The movable arm of stepping switch 1SRU is connected to a line conductor L14.

The fixed contacts of the unit switches in group 148 are connected together and, in turn, are connected to one side of a normally-closed switch contact $a_1$ of switch SS1, the opposite side of said contact connecting to one side of the coil for a relay identified as 13CR. The opposite side of the coil for said relay is connected through a second normally-closed switch contact $b_1$ of switch SS1 and a suitable jumper to each of the fixed contacts of the "Tens" switches for switch group 148.

A unidirectional stepping switch 1SRT similar to stepping switch 1SRU has each of its stationary contacts numbered 0–9 connected to a correspondingly numbered depressible contact 0–9 of the "Tens" switches of group 148. Each of the stationary contacts of the stepping switch 1SRT is likewise seen to be connected in parallel to a correspondingly numbered depressible contact of the "Tens" switches of switch group 149.

The coil of a relay 14CR is seen to be connected through serially connected normally-closed switch contacts $c_1$, $d_1$ of switch SS1 across the stationary contacts of the "Units" and "Tens" switches of switch group 149.

The manually settable switch group 148 may be hereinafter referred to as the First Command Horizontal Switch Group, and switch group 149 may be similarly referred to as the Second Command Horizontal Switch Group, said controls being manually actuated by the operator to control the sequential movement of the article conveyor C along the aisle E to each of its first and second positions.

The normally-open contact $a_2$ of switch SS1 is seen to be connected to one side of the relay coil 14CR, whereas the normally-open contact $c_2$ of said switch SS1 is connected to one side of relay coil 13CR. The normally-open contact $b_2$ of switch SS1 is seen to be connected to the stationary contacts of the switches in the Tens row of bank 149 and the normally-open contact $d_2$ of switch SS1 is similarly connected to the stationary contacts of the Tens row in bank 148.

A unidirectional stepping switch of conventional form identified as 2SRU (FIGURE 9H) is seen to have each of its stationary contacts numbered 0-9 connected to a correspondingly numbered depressible contact of the "Units" switch row in the switch group 150, said stationary contacts being likewise connected in parallel with a correspondingly numbered depressible switch contact in the "Units" row of the switch group 151.

The stationuary switch contacts in the "Units" row of group 150 are connected together and to one side of a normally closed contact CRPD' (FIGURE 9H) of a relay CRPD (FIGURE 9B, line 20), the opposite side of said contact connecting through normally-closed contact $e_1$ of switch SS1 to one side of the coil of a relay 16CR.

A normally open contact CRPD" (FIGURE 9H) of relay CRPD is likewise connected between stationary contact No. 2 of the stepping relay 2SRU and the junction of the closed contact CRPD' of relay CRPD and the coil of relay 16CR.

The opposite side of the coil of relay 16CR is connected through normally-closed contact $f_1$ of switch SS1 to the fixed contact of each switch element in the "Tens" switch row of group 150, each of the movable switch contacts (0-9) being connected to a correspondingly numbered stationary contact (0-9) of a similar unidirectional stepping switch 2SRT.

The movable contact arm of stepping switch 2SRU is connected to line conductor L14 and in like manner the movable contact arm of stepping switch 2SRT is connected to line conductor L12.

The stationary contacts of the "Units" and "Tens" switches in group 151 are connected through serially connected normally-closed switch contacts $g_1$, $h_1$ of switch SS1 across the coil of a relay identified as 17CR, thereby connecting said switch groups between the stepping relays 2SRU and 2SRT through said relay coil.

A normally open contact CRPD''' of relay CRPD is likewise connected across stationary contacts of the "Tens" switch group 36 and the aforesaid line conductor L12.

The normally-open switch contact $e_2$ of switch SS1 is seen to be connected to one side of relay coil 17CR, whereas the normally-open contact $g_2$ thereof is connected to one side of relay coil 16CR.

The normally-open contact $f_2$ of switch SS1 is connected to the stationary contacts of switches in the Tens row of bank 151, and the normally-open contact $h_2$ is similarly connected to the Tens row of switches in the switch bank 150. As will later appear, switch SS1 comprises a "Cross Over" switch enabling the components connected thereto to be controlled to enable the conveyor system herein to "Order Pick."

Another operator program control is seen in FIG. 9D to be associated with the aforementioned proximity switch elements LS2 A–D and LS3 A–D. As heretofore mentioned, the proximity switch elements LS2 A–D and LS3 A–D are disposed in pairs LS2A, LS3A; LS2B, LS3B; LS2C, LS3C; and LS2D, LS3D; the storage bays A and B, as is also aforementioned, being divided into zones $a, b, c$ and $d$, one pair of switch elements being assigned to each zone, respectively.

To enable the bin in either bay (A or B) and in any one zone ($a$–$d$) to be selected as the first article dispensing position for the article conveyor C, a group of four normally open pushbutton switches as identified at 154 (FIGURE 9D), is assigned to represent zone $a, b, c$ and $d$. Switches for zones $a$ and $c$ are seen to have their stationary contacts connected together and in parallel with the proximity switches LS2A, LS3A and LS2C, LS3C, respectively. Switches for zones $b$ and $d$ are similarly connected together and to proximity switches LS2B, LS3B and LS2D, LS3D, respectively.

The movable contacts of zone switches $a$ and $b$ are likewise connected to the stationary contact of a push button type switch identified as Bay Switch A, under the First Command Console. The movable contact of Bay Switch A is connected to one side of a normally-open contact of a relay 5CR, the opposite side of said contact connecting to line conductor L8.

The movable contacts of zone switches $c$ and $d$ (FIGURE 9D) are seen to be connected to the stationary contact of a similar pushbutton type switch identified as Bay Switch B, the movable contact of which is connected to the movable contact of Bay Switch A.

With this circuitry, by closing either Bay Switch A or B and any one of the zone switches $a$–$d$, any one of the pairs of proximity switch elements may be connected into the circuitry and thereby used to properly locate the article conveyor C at the first article dispensing position in the respective zone.

In like manner, to select either bay A or B and any one bin in any zone ($a$–$d$) as the second article dispensing position, a group of four normally open push-button switches identified at 156 has each switch similarly assigned to represent one zone ($a$–$d$) as is shown in FIG. 9D. The stationary contacts of zone switches $a$ and $c$ are seen to be connected to each other and in parallel with zone switches $a$ and $c$ of group 154 to proximity switch elements LS2A, LS3A and LS2C, LS3C. Likewise, zone switch $b$ and $d$ of switch group 156 are similarly connected in parallel with zone switches $b$ and $d$ of group 154 to proximity switch elements LS2B, LS3B and LS2D, LS3D.

The movable contacts of zone switches $a$ and $b$ of group 156 are likewise connected to the stationary contact of a push button type switch identified as Bay Switch A', under the Second Command Console. The movable contact of Bay Switch A' is connected to one side of a normally-open contact of a relay 10CR, the opposite side of said contact connecting to line conductor L8.

The movable contacts of zone switches $c$ and $d$ are seen to be connected to the stationary contact of a similar push-button type switch identified as Bay Switch B', the movable contact of which is connected to the movable contact of Bay Switch A'.

With this circuitry, by closing either Bay Switch A' or B' and any one of the zone switches ($a$–$d$) any one of the pairs of proximity switch elements may be connected into the circuitry and used to properly locate the article conveyor C at the second article dispensing position.

A normally-closed contact of a relay identified as 1CRL is connected in series between the zone switch elements $a$ and $c$ of each switch group 154 and 156 and the proximity switch elements LS2A, LS3A. In like manner a normally open contact 1CRL is seen to be connected in series with the proximity switch elements LS2C, LS3C, and the zone switches $a$ and $c$ of switch groups 154 and 156.

Similarly, a normally closed contact of relay 1CRL is seen to be connected in series between proximity switch elements LS2B, LS3B and the zone switches $b$ and $d$ in switch groups 154 and 156. Likewise a normally open contact of said relay 1CRL is connected serially between the pair of proximity switch elements LS2D, LS3D and the switch elements representing zones $b$ and $d$ in either switch group 154, 156.

One side of each proximity switch LS2 A–D is seen to be connected together and to one side of a coil of relay 6CR, the opposite side of said coil connecting to line conductor L12. In like manner one side of each proximity switch LS3 A–D is seen to be connected together and to one side of the coil of a relay identified as 7CR, the opposite side of said relay coil likewise connecting to said line conductor L12.

Additional operator controls for programming the movement of the article conveyor C include an On-Off control switch identified at 50 in FIG. 9B which, in its on position, enables the instant control circuit to automatically program the movement of the conveyor through two article dispensing positions, and in its off position enables said circiut to automatically control the conveyor movement to a single article dispensing position. Switch 50 has two sets of normally-open contacts as seen in FIGS. 9B and 9E.

Another operator control is identified at 52 in FIG. 9B as the "cycle start" push-button switch which, in its closed position, as will be hereinafter described, initiates the start of the automatic programmed movement of the article conveyor C. Switch 52 is also provided with two sets of normally-open contacts as is shown in FIG. 9B.

Normally-open push-button switches 55 and 56 as seen in FIG. 9B and identified as P & D Right and P & D Left, respectively, are operable to control the movement of the carriage table 10 into either bay B or bay A.

Normally-open push-button switches, as indicated at 58 and 59 in FIGS. 9B and 9C, and referred to as the First Command Bay Switch and Second Command Bay Switch, respectively, are also operated to program the direction of movement of said carriage table 10 in each of its two article dispensing positions.

A normally-closed push-button switch 62 as seen in FIG. 9B is identified as the Stop Switch and is operable, when opened, to stop the article conveyor at the position it then occupies.

A manually operated normally-open push-button switch 64 identified in FIG. 9B as the Master Start Cycle-Return switch is operable, when closed, to initiate the movement of the article conveyor to a single article dispensing position and to return it to its FIG. 1 load and discharge station.

Additional operator controls include a normally-open push-button switch 68 as identified in FIG. 9E which is operable, when closed, to provide for power to the drive motor 115 for the extensible table 102.

In addition, said Switch 68 is operable to initiate the return of the article conveyor to the load and discharge station if the conveyor happens to be somewhere within the load storage area at that time.

*Two command storage cycle*

With the control elements thus far described assume now that it is desired to program the movement of the article conveyor through a two command storage cycle having two article dispensing positions, as for example, to a first position whereat an article is discharged into a selected bin in one of the storage bays A or B, and then to a second position whereat an article is removed from a preselected bin and thereafter conveyed to the article load and discharge station as seen in FIG. 1.

The operator closes line switch 140 (FIG. 9A) and presses the start push-button switch 145 effective to energize the coil of relay M and close relay contacts M to lock in said coil and provide power to the conveyor mast assembly through the aforementioned conventional collector elements.

The Master Start-Cycle Return switch 64 (FIGURE 9B, line 4) is next closed to energize relay CRM to supply power to the remainder of the control circuit.

Next, the operator actuates switch 50, FIGS. 9B and 9E to its closed position and switch 68 (FIG. 9E) to its closed position.

The first command horizontal and vertical switch banks 148 and 150 (FIGS. 9G and 9H respectively) are next actuated to identify the bin to which the article conveyor C is to be moved for the first article dispensing position.

For example, assuming that bin Y in bay A as shown in FIG. 1 is selected as the bin for the first article dispensing position, the push-button switch numbered 6 in the "Units" row and the zero numbered switch in the "Tens" row of switch bank 148 are depressed to their closed position.

In like manner, the switch elements numbered one in each of the Units and Tens row of switch elements in Switch bank 150 are depressed to their closed position.

The switch element identified in FIG. 9D under the first command switch bank 154 as Bay A switch and switch element zone $b$ are actuated to their closed position.

Selecting bin $b_2$ in bay B as identified in FIG. 1 as the second article dispensing position, the push-button switch element numbered one in each of the Units and Tens row in switch bank 149 is depressed to its closed position.

Likewise, the switch element numbered two in the unit row and the switch element numbered one in the Tens row in switch bank 151 are depressed to their respective closed positions.

The switch element identified in FIG. 9D under the second command switch blank 156 as Bay B' switch and switch element zone $d$ are also actuated to their closed positions.

With the article conveyor C and its carriage G located at the load and discharge station, and further with an article deposited on the carriage table 102, limit switches 5LS, 9LS, 10LS and 13LS (FIGURE 9B, line 20) are actuated to their closed positions.

As seen in FIG. 9B, limit switches 5LS, 9LS and 10LS are in series controlling relation with the Cycle Start Switch 52 and the coil of relay 4CR.

Limit switch 13LS, as aforementioned, is mounted on the carriage G and is operated by the table 102 to indicate that it has reutrned to its centered position as is shown in FIG. 1.

As seen in FIG. 9B (line 20), limit switch 13LS is connected on one end to line conductor L14 and on the opposite side in series with a normally-open contact of relay 5CR and the movable contact of the First Command Bay switch 58.

As before mentioned, the first dispensing position is selected as bin Y in Bay A as seen in FIG. 1, and in this instance the switch element L of switch 58 is depressed to its closed position to thereby program the movement of the carriage table 102 so that it will extend to the left into bin Y when the article conveyor C has been positioned directly opposite thereto.

In like manner, having selected bin $b_2$ in bay B as the second article dispensing position, switch element R in the Second Command Bay switch 59 (FIGURE 9C, line 22) is closed to program the movement of the carriage table so that it will be able to move to the right as viewed in FIG. 1 into bin $b_2$ as the conveyor C is positioned opposite thereto.

The operator next closes the Discharge switch 160 (FIG. 9E, line 59) effective to energize the coils of latching relays 2CRL and 2CRLA (line 51) and close the normally open contact 2CRLA (line 60) whereby to illuminate the Discharge light and thereby indicate that an article is to be deposited into bin Y at the first article dispensing position.

Having made the above switch settings which programs the movement of the conveyor C through two article dispensing positions, the Cycle Start push-button switch 52 (FIGURE 9B, line 10) is next closed whereby the coils of relays 4CR, 2TR, 5CR, 5CRA, IM Forward, IM Fast, 2MUP, 2M Fast and 19CR are each energized.

As seen in FIG. 9B, line 10 the coil of relay 4CR is in series relation with the Cycle Start switch 52 and upon being energized closes its normally open contact 4CR (line 14) FIG. 9B to thereby provide power to line conductor L₇.

The actuation of relays IM Fast and IM Forward (FIGURE 9C) causes the energization of the horizontal drive motor k for the conveyor C whereby the conveyor moves forwardly in Fast speed into the aisle E toward bin Y in bay A.

As the conveyor C moves horizontally through the aisle E, the proximity switch LS2B (FIG. 9D), senses the presence of each vertical bay post P and is actuated thereby.

The actuation of LS2B as seen in FIG. 9D energizes the coil of relay 6CR which, in turn, causes the energization of the coil of stepping relay 1SRU (line 67, FIG. 9F).

The normally closed contact of relay 1SRU in line 67, FIG. 9F, is opened upon the energization of its coil whereby the relay coil is pulsed each time the proximity switch LS2B is moved into proximity with a vertical post P so that said stepping relay provides a count for the conveyor C as it moves in the horizontal direction.

As a result the stepping relay 1SRU (FIGURE 9G) steps on each pulse received from switch LS2B and relay 6CR. The horizontal count is continued as the conveyor C passes each bay post P until the position of the movable contacts of relay 1SRU matches the pushbutton selector of switch bank 148 to define bin Y (number 6 switch in the "Units" row and the zero switch in the "Tens" row.)

With bin Y in bay A selected as the first article dispensing position whereby the switch numbered 6 in the "Units" row and the zero numbered switch in the "Tens" row of said horizontal switch bank 148 are closed, the relay 1SRU is stepped until it engages its number six stationary contact. When this occurs, and with the movable contact of relay 1SRT at its zero position, the coil of relay 13CR (FIG. 9G) is energized.

As a result, the coil of relay IM Fast (line 27, FIG. 9C) is de-energized and the coil of relay IM Slow (line 31, FIG. 9C) is energized.

The horizontal drive motor k, FIG. 9A is thereby energized to now move the conveyor C in slow horizontal speed toward bin Y.

The proximity switch is mounted on the conveyor mast so that the motor k changes from fast to slow speed as the conveyor C passes the bay post P that defines the approach side of the bin into which the article is to be deposited, as in the present instance vertical post P₆ defining the approach side of bin Y as seen in FIG. 1.

As the conveyor C moves opposite the bin Y, the proximity switch LS2B is moved out of its magnetic range of post P₆ which distance may be selected to be of any suitable dimension as will be understood.

When this occurs, the relay 6CR (FIGURE 9D) is de-energized and, as a result the coil of relay 8CR (line 34, FIG. 9C) is energized.

The conveyor C continues in slow speed until the proximity switch LS3B (FIGURES 2 and 9D) is carried past the next post P whereby the coil of relay 7CR (FIG. 9D) is energized to close its normally-open contact (line 36, FIG. 9C) and effect the energization of the coil of relay 1TR.

The energization of relay 1TR de-energizes relay IM Slow (line 31, FIG. 9C) whereby power to the horizontal motor k is terminated.

The conveyor C coasts until the proximity switch LS3B is deactivated upon leaving the magnetic sensing area of the bay post, whereby relays 7CR (FIGURE 9D) and IM Forward (FIGURE 9C, line 24) are de-energized.

As a result, power to the horizontal brake is cut off so that the brake engages motor k to stop the horizontal movement of the conveyor C.

The switch LS3B is carried on the conveyor mast so that it is deactivated at the instant the conveyor C is centered in the bin Y.

The relay 1TR (FIGURE 9C, line 36) is a conventional time delay relay and in the event the conveyor C does not move to a centered position effective to deactivate proximity switch LS3B, the contact of relay 1TR (line 32, FIG. 9C) closes to re-energize relay IM Slow so that the conveyor C is again moved until it reaches its centered position within the bin Y.

Simultaneously with the horizontal movement of the conveyor C, the coils of relays 2MUP (FIGURE 9C, line 39), 19CR (FIGURE 9C, line 40) and 2M Fast (FIGURE 9E, line 45) are energized whereby the vertical drive motor s is powered to move the article carriage G upwardly along the conveyor mast.

As the carriage passes each horizontal rail R the limit switch 7LS (line 75, FIG. 9F and FIGURE 5) is momentarily closed to energize the coil of stepping relay 2SRU and step its movable contact (FIGURE 9H) into successive engagement with the fixed contacts of said relay.

Each time the limit switch 7LS is actuated it indicates that the carriage G has risen to the next bin level.

The stepping relay 2SRU therefore provides a vertical count for the carriage G.

As aforementioned, the bin Y is selected as the first article dispensing position and this bin has a vertical count of 11. Consequently, the number one switch in both the "Unit" row and "Tens" row in the switch bank 150 (FIGURE 9H) are closed by the operator.

The stepping relay 2SRU is therefore pulsed so as to carry its movable contact through one complete cycle after which it closes its "cascade contact" (line 80, FIG. 9F) effective to momentarily energize the coil of relay 2SRT.

As a result the movable contact of relay 2SRT (FIG. 9H) is moved into engagement with the number one fixed contact.

The carriage G continues to rise and the limit switch 7LS is again closed by the rail R, defining the bottom of bin Y. As a result the relay 2SRU is momentarily energized to step its movable contact into engagement with the number one fixed contact.

At this instant, the positions of the movable contacts of relays 2SRU and 2SRT match the actuated switch position of switch bank 150 thereby resulting in the coil of relay 16CR (FIG. 9H) being energized.

As a result, relay 2M Fast (FIGURE 9E, line 45) is de-energized and relay 2M Slow is energized (line 47, FIG. 9E).

The vertical drive motor s is put into slow speed effective to raise the carriage G slowly opposite bin Y until limit switches 11LS and 8LSH are actuated (FIGS. 5, 9C and 9E). The relays 2MUP and 2M slow (line 39, FIG. 9C and line 43, FIG. 9E, respectively) are de-energized thus stopping the carriage G opposite the opening of bin Y.

With the carriage G in position the extensible table is then projected into the bin Y preparatory to depositing the article therein.

As aforesaid, with the bin Y selected as the first article dispensing position, the switch L of first command bay switch 58 (line 21, FIG. 9B) was previously closed by the operator thus programming the extension of the table to the left as viewed in FIG. 1.

The closing of switch 58 energizes the relay 1CRU (line 23, FIG. 9C), unlatching relay 1CRL.

Consequently, when limit switch 8LSH is closed (line 49, FIG. 9E) the coil of relay 3ML is energized effective to power the table drive motor 115, FIG. 9A, so as to extend the table 102 to the left into bin Y.

As the table moves into the opening of bin Y the limit switch 13LS (line 50, FIG. 9E) is closed thus locking in the coil of relay 3ML (FIGURE 9E, line 50) across the line conductors L14 and L12.

As limit switch 13LS is actuated its contact (line 20, FIG. 9B) is opened to de-energize relays 8CR and 1TR (line 34, FIG. 9C).

With relay 3ML energized, the coil of relay 10CR is energized (lines 55, 56, FIG. 9E) to ready the conveyor C and carriage G for the second article dispensing cycle.

As the table 102 moves out into the bin Y, limit switch 10LS is released closing its contact (line 12, FIG. 9B) to re-energize relay 4CR (line 10, FIG. 9B).

When the table is fully extended to the left, the limit switch 12LSL is actuated opening its contact (line 50, FIG. 9E) and closing its contact (line 54, FIG. 9E). Relay 3ML is de-energized thereby stopping the extension of table 102.

As the contact of switch 12LSL closes, the coils of relays 9CR and 9CRA are energized (line 55, FIG. 9E).

The energization of relays 9CR and 9CRA de-energizes relays 4CR and 2TR (lines 10 and 16, FIG. 9B) and energizes relays 2M Down (line 44, FIG. 9E) and 2M Slow (line 47, FIG. 9E) effective to lower the carriage G with the table 102 extended.

The carriage G lowers until the limit switch LS8L is actuated (line 41, FIG. 9C; line 50, FIG. 9E). This switch LS8L is preferably operated when the carriage G has lowered approximately two inches during which interval the pallet supporting the article to be inserted into bin Y is deposited onto the bin angles R, FIG. 3.

The operator of switch LS8L also de-energizes relays 2M Down and 2M Slow to stop the vertical movement of the carriage G, and energizes the coil of relay 3MR (line 49, FIG. 9E) effective to reversibly energize the table drive motor 115 so as to return the table 102 to its centered position. As the table 102 approaches its centered position the limit switch 12LSL is released to de-energize relay 9CR (line 54, FIG. 9E).

The table 102 continues to move toward its centered position until the limit switch 13LS is actuated (line 50, FIG. 9E) to de-energize the relay 3MR (line 49, FIG. 9E) and stop the table movement.

The operator of limit switch 13LS closes its contact (line 20, FIG. 9B) effective to energize relay 3TR (line 57, FIG. 9E).

The energization of relay 3TR which is preferably a conventional time delay relay, causes the energization of unlatch relays 2CRU, 2CRUA (line 54, FIG. 9E) to thereby unlatch relays 2CRL, 2CRLA (line 51, FIG. 9E) whereby the contact 2CRLA (line 62) is closed to turn on the "Pick Up" light and the contact 2CRLA (line 60) is opened to turn out the "Discharge" light.

Relay 3TR times out to open its contact (line 19, FIG. 9B) and de-energizes relays 5CR and 5CRA (line 18, FIG. 9B).

With relay 10CR (line 56, FIG. 9E) energized, its contact (line 12, FIG. 9B) is closed whereby to energize relay 4CR (line 1, FIG. 9B) relay 4CR in turn energizing relay 2TR (line 16, FIG. 9B).

The system is now ready to begin the second article dispensing cycle.

The bin selected for the second article dispensing position may be at the same position as the first bin, for example the bin opposite to the first bin further into the storage area in the forward direction as seen in FIG. 1 in either bay A or B, or located closed to the article load and discharge station C. It may also be located on the same level or at a higher or lower level than the first bin.

In the example herein illustrated wherein bin $b_2$ in bay B is selected as the second article dispensing position, this bin $b_2$ is further into the storage area, at a higher level than bin Y and also in the opposite bay B.

In this instance, at the end of the first dispensing cycle, relays 2TR (line 16, FIG. 9B) and 10CR (line 56, FIG. 9E) remain energized.

As a result, relay 1M Forward (line 24, FIG. 9C) and relay 1M Fast (line 27, FIG. 9C) are energized. The conveyor C proceeds along aisle E in a forward direction as depicted by arrow A in FIG. 1.

Since the bin $b_2$ is located in zone $d$ of bay B, the proximity switch pair LS2D, LS3D of switch bank 156 are actuated by closing zone switch $d$ (FIG. 9D).

Proximity switch LS2D is pulsed each time it passes a vertical bay post P providing a horizontal count for the conveyor C thereby stepping the movable contact of stepping relay 1SRU into engagement with its stationary contacts (FIG. 9G).

With the bin $b_2$ selected as the second dispensing position, the number one switch in the "Units" row and the number one switch in the "Tens" row of switch bank 149 (FIG. 9G) are closed.

Likewise, the number two switch in the "Units" row and the number one switch in the "Tens" row in switch bank 151 (FIG. 9H) are closed.

As is previously mentioned when the movable contact of stepping switch 1SRU completes one revolution, it closes its cascade contact (line 72, FIG. 9F) as will be understood effective to momentarily energize the coil of relay 1SRT which, in turn, is effective to step its movable contact into engagement with the next succeeding fixed contact.

The conveyor C continues to move forwardly down the aisle E until the contact position of relays 1SRU and 1SRT match the actuated switches of switch bank 149 whereby to energize the coil of relays 14CR and 15CR (FIG. 9G).

The energization of relay 14CR opens its contact (line 28, FIG. 9C) to de-energize relay 1M Fast (line 27, FIG. 9C).

Likewise, 14CR contact (line 30, FIG. 9C) is closed to energize relay 1M Slow (line 31, FIG. 9C) whereby horizontal drive motor $k$ moves the conveyor C in slow speed.

The proximity switch 3LSD is then actuated by the next bay post P defining one side of the bin $b_2$ whereby to energize relays 7CR (FIG. 9D) and 1TR (line 36, FIG. 9C).

Relay 1M Slow is de-energized whereby the conveyor C coasts into the position directly opposite the opening of bin $b_2$.

When the conveyor C is centered within said bin opening proximity switch 3LSD is deactivated so as to de-energize relays 7CR and 1M Forward and apply the brake to the drive motor $k$.

Simultaneously, with the horizontal travel of conveyor C the article carriage G is raised so as to be located at the level of bin $b_2$.

As previously indicated, at the end of the first article dispensing cycle relays 2TR (line 16, FIG. 9B) and 10CR (line 56, FIG. 9E) are energized.

As a result relays 2M Up, 19CR (line 39, FIG. 9C) and relay 2M Fast (line 45, FIG. 9E) are energized whereby the vertical drive motor $s$ is likewise energized to move the carriage G upward in fast speed.

The limit switch 7LS (line 75, FIG. 9F) resumes its vertical count in the manner previously described each time it passes one of the bay rails R until the contact position of stepping relays 2SRU and 2SRT (FIG. 9H) match the closed switches of switch bank 151.

When this occurs relay 17CR (FIG. 9H) is energized which, in turn, energizes relay 18CR (FIG. 9H).

The relay contact 17CR (line 46, FIG. 9E) closes to energize relay 2M Slow whereby to raise the cartridge G in slow speed until limit switch 11LS (line 49, FIG. 9E) and 8LSL (line 41, FIG. 9C) is operated by its cam abutment (FIG. 5).

Relay 2M Up (line 41, FIG. 9C) is de-energized to stop the upward travel of the carriage G at the instant the table 102 is slightly below the pallet supporting the article in bin $b_2$ which is to be removed. In actual practice it is preferred to stop the carriage G when the table 102 is approximately one inch below the aforesaid pallet.

With the carriage G in position at bin $b_2$, and with the R switch of Second Command switch bank 59 closed, the relay 1CRL (line 22, FIG. 9C) is energized to, in turn, energize relay 3MR (line 49, FIG. 9E) effective to power the table drive motor 115 and extend the table 102 to the right as seen in FIG. 1 into bin $b_2$.

When the table 102 is fully extended, releasing as it moves limit switch 13LS, limit switch 12LSR is actuated opening its contact (line 49, FIG. 9E) effective to de-energize relay 3MR and stop the drive motor 115.

Relay 4CR (line 10, FIG. 9B) and 2TR (line 16, FIG. 9B) are also de-energized whereby to energize relays 2MUP (line 39, FIG. 9C) and 2M Slow (line 47, FIG. 9E) and provide power to drive motor $s$.

The carriage G rises in slow speed and lifts the pallet in bin $b_2$ off the rails R until limit switch 8LSL is released and limit switch 8LSH is actuated (line 40, FIG. 9C). Relays 2MUP and 2M slow are de-energized thereby stopping motor $s$.

Relay 3ML (line 50, FIG. 9E) is energized by the switch contact 8LSH (line 49, FIG. 9E) being closed whereby the table drive motor 22 is reversibly energized to return the table and the load carried thereon to its centered position within the conveyor mast.

As the table 102 is returned, limit switch 12LSR is released to de-energize relay 9CR (line 54, FIG. 9E).

As the table 102 is being retracted the limit switch 10LS is also engaged to thus signal the presence of the load placed thereon.

As the table reaches its centered position it actuates limit switch 13LS (line 50, FIG. 9E) to de-energize relay 3ML and stop motor 115.

The 13LS contact (line 20, FIG. 9B) is closed to connect relay coil 3TR (line 57, FIG. 9E) across line conductors $L_9$ and $L_{12}$ thereby energizing said coil and relay coils 2CRL and 2CRLA (line 52, FIG. 9E).

The "Pickup" light (line 60, FIG. 9E) goes out and "Discharge" light turns on to visually indicate the pickup of the article at the second dispensing position bin $b_2$.

As aforementioned the relay 3TR is a conventional time delay relay and after a suitable delay, for example .5 second, the 3TR contact closes (line 58, FIG. 9E) to energize relay coil 12CR.

Relays 1M Fast Reverse (line 26, FIG. 9C) relay 1M Fast (line 27, FIG. 9C) 2M Down (line 44, FIG. 9E) and 2M Fast (line 45, FIG. 9E) are each energized.

The horizontal and vertical drive motors, $k$ and $s$ respectively, are reversibly energized to move the conveyor C and carriage G in fast speed toward the load and discharge station as seen in FIG. 1.

As will be understood the horizontal and vertical stepping relays 1SRU, 1SRT, 2SRU and 2SRT (lines 66, 71, 75 and 80, FIG. 9F) are returned to the zero positions by their respective reset circuits so as to be ready for the next article dispensing cycle.

The conveyor C returns along aisle E until it trips limit switch 4LS FIG. 3 (lines 29, 30, FIG. 9C) near the load and discharge station whereby the relay 1M Fast is de-energized and relay 1M Slow (line 31, FIG. 9C) and relay 8CR (line 34, FIG. 9C) are energized.

The horizontal drive motor $k$ is put into low speed and continues to return the conveyor until the limit switch 4LS is released. At this instant relay 1M Slow is de-energized and relay 1TR (line 36, FIG. 9C) is energized.

The conveyor C continues to coast until it trips limit switch 5LS, FIG. 3, closing its contact (line 10, FIG. 9B) and opening its contact (line 26, FIG. 9C).

The relay 1M Reverse, 8CR and 1TR are de-energized whereby the conveyor C stops in the load and discharge position as seen in FIG. 1.

In the event the conveyor C does not coast to its FIG. 1 position, the relay 1TR which is preferably a conventional time delay relay operates to reclose its contact (line 31, FIG. 9C) whereby to re-energize the relay 1M Slow and enable the conveyor drive motor $k$ to continue to return the conveyor C back to its load and discharge station at which time the limit switch LS5 is again triggered.

In the event the second article dispensing position is at the same bay position as the first article dispensing position, for example in bay B as the second position bin V as compared to bin Y in bay A, as the first position, when the conveyor C reaches its first position, bin Y, both the first and second command switches of switch banks 148 and 149 are in circuit whereby to energize the coils of relays 13CR and 14CR.

As a result, the conveyor C is not moved in a horizontal direction along the aisle E and the vertical positioning of the article carriage G proceeds to locate the same opposite bin V in bay B.

In the event the second dispensing position is at the same vertical level as the first position, for example, bin W in bay B as the second position as compared to bin Y as the first position, when the carriage G has reached its first position bin Y, both first and second command switches of switch banks 150 and 151 are in circuit to energize the coils of relays 16CR, 17CR and 18CR. As a result, the carriage G remains in the same vertical position while the conveyor C is moved horizontally through the aisle E in the manner above described to locate the carriage G opposite bin W.

A still further advantage of the control circuitry of the present invention is in its ability to program and control the movement of the conveyor C and carriage G to a second article dispensing position where said second position is either at a smaller bay location, or smaller level position, or both, with respect to the first article dispensing position whereby the conveyor is moved to said second position without its first returning to the load and discharge station.

For example, assuming that bin Y is to be the first article dispensing position and bin Z is to be the second article dispensing position, as the conveyor C proceeds down the aisle toward the first dispensing position, the horizontal stepping switches 1SRU and 1SRT will also complete a circuit through the second command switches (number three "Units" row and number zero in the "Tens" row) of switch bank 149 whereby the coil of relays 14CR and 15CR (FIG. 9G) are energized. Relay 15CR is "locked in" by its contact FIG. 9G, but relay 14CR drops out as the horizontal count is continued by the respective proximity switch which, in this case, is LS2B. The horizontal conveyor continues toward its first command until the switches 1SRU and 1SRT matches the actuated switch elements of switch bank 148. Relay 13CR (FIG. 9G) 1M slow (FIG. 9C, line 31) and 8CR (FIG. 9C, line 34) shortly thereafter are energized. 8CR energizes 1SRU and 1SRT through their respective self-interrupting contacts (FIG. 9F, lines 67 and 72) and the "0" reset circuit deck of each switch causes the stepping switch to reset to their "0" position.

The stepping switches 1SRU, 1SRT, 2SRU and 2SRT are each preferably of the type that is commercially available under the trade name "Ledex Stepping Switch" from the Leland Corporation, Dayton, Ohio.

Each of said switches comprises a plurality of wafer type decks $d$ as referred to in the art, one of said decks being the counting deck as seen in FIGS. 9G and 9H and another the aforesaid "reset deck" as is seen in FIG. 9F (lines 70, 73, 78 and 80). Each reset deck comprises a rotary arm $a$ mounted on the switch shaft $s$ which arm engages a conductive rail $r$ for all stepped positions of the switch with the exception of the "zero" position for said arm $a$. In this "zero position," as the rotary arm $a$ is moved thereto, it is disconnected from its respective relay coil whereby said coil is de-energized.

Thereafter, the motion of the table 102 to the right upon entering or leaving the bin opening at the first dispensing position, actuates limit switch 12LSR (FIG. 9E, line 49) which in turn energizes relay 3MR to close its contact (FIG. 9F, line 69).

Relay contact 3MR (FIG. 9F, line 69) energizes the coil of stepping relay 1SRU (FIG. 9F, line 67) whereby said relay 1SRU and relay 1SRT (FIG. 9G) are stepped to an actuated position in a manner previously described to match the actuated switch position of the horizontal second command switch bank 149.

In this instance, the movable wiper or contact of relay 1SRU will stop at fixed contact 3 and the movable contact of relay 1SRT at its fixed contact 0 signifying the position for bin Z.

As a result the coil of relay 13CR (FIG. 9G) is again de-energized and relay coil 14CR (FIG. 9G) is energized.

Thereafter, as the table 102 returns to its center position on the article carriage G to complete the first article dispensing cycle, the coils of relays 1M Reverse (FIG. 9C, line 26) and 1M Fast (FIG. 9C, line 27) are energized.

Since the bin Z representing the second dispensing position is also located at a lower vertical level as compared to bin Y, the stepping switches 2SRU and 2SRT are also similarly actuated as the limit switch 7LS counts to locate the first dispensing position.

When the switches 2SRU and 2SRT are stepped to a position momentarly equalling the actuated position of switch bank 151 defining the second article dispensing position which, in the present instant, is switch No. 5 in the Units Row and switch No. 0 in the Tens Row of said switch bank 151, the coils of relays 17CR and 18CR (FIG. 9H) are energized.

As the switches 2SRU and 2SRT continue in their respective count toward the first dispensing position, relay coil 17CR drops out but coil 18CR remains energized through its lock-in contact (FIGURE 9H).

When the carriage G has moved to its first dispensing position, it actuates the coil of relay 2M Slow as previously mentioned (FIG. 9E, line 47). Relay 2M Slow energizes to close its contact (FIG. 9E, line 77) effective to energize relays 2SRU and 2SRT and reset the same through their respective "reset circuit decks" (FIG. 9F, lines 78 and 80) to zero position.

Thereafter, during the movement of the article table 102 to the left, either upon entering or leaving the bin defining the first dispensing position (bin Y in this instance) the coil of relay 3ML (FIG. 9E, line 50) is energized by limit switch 12LSL.

The energization of relay 3ML causes the stepping relays 2SRU and 2SRT to be re-energized through 3ML contact (FIG. 9F, line 77) whereby said stepping switches are actuated to a position matching the switch position of switch bank 151 for the second article dispensing position (bin Z). When this occurs, relay 16CR is again de-energized and relay 17CR is energized (FIG. 9H).

At the completion of the first article dispensing cycle wherein an article is deposited into bin Y, the coils of relays 2M Down and 2M Fast (FIG. 9E, lines 44 and 45) are energized along with the coils of relays 1M Reverse and 1M Fast (FIG. 9C, lines 26 and 27).

As a result, the conveyor C returns in fast speed toward the aforesaid load and discharge station while simultaneously the carriage G lowers to its home position on said conveyor mast.

As the conveyor C moves out of the storage area, the proximity limit switch pair (LS3C, LS2C) (FIG. 9D) are actuated as they are carried past each vertical bin post in the direction of the arrow B in FIG. 1 to thereby provide a horizontal count. The coil of relay 7CR (FIG. 9D) is energized by limit switch LS3C to, in turn, energize the coil of stepping switch 1SRU through the 7CR contact (FIG. 9F, line 68) whereby the switches 1SRU and 1SRT are stepped each time the proximity switches LS3C is actuated.

This horizontal count, corresponding to the horizontal movement of the conveyor C out of the aisle E, continues until the positions of switches 1SRU and 1SRT again match the actuated switch positions of the first command horizontal switch bank 148, which is switch No. 6 in the Units Row and Switch No. 0 in the Tens Row of said bank representing bin Y.

When this actuated position for stepping switches 1SRU and 1SRT has been reached, the conveyor C has traversed the horizontal distance in the aisle E between the first and second article dispensing positions (bin Y and bin Z, respectively) and is located at the latter (bin Z).

Simultaneously, as the carriage G moves downwardly along the conveyor mast, the limit switch 7LS (FIG. 9F, line 75) is actuated at each bin level by the cam on the mast F corresponding to the level of each horizontal bar R to thereby define a vertical count.

Each time the limit switch 7LS is actuated it energizes the coil of stepping switch 2SRU whereby to step said switch and switch 2SRT. This vertical count continues until the actuated positions for stepping switches 2SRU and 2SRT again match or correspond to the actuated switch positions of the first command vertical switch bank 150, which is switch No. 1 in the Units Row and Switch No. 1 in the Tens Row of switch bank 150 representing bin Y.

When this actuated position for stepping switches 2SRU and 2SRT has been reached, the carriage G has traversed the vertical distance between the first article dispensing position (bin Y) and the second article dispensing position (bin Z) and is located at the latter (bin Z).

As will now be realized as the conveyor C and carriage G move in a reverse direction along the aisle E toward the second article dispensing position, the unidirectional stepping switches 1SRU, 1SRT and 2SRU, 2SRT are stepped in the same direction as previously actuated to return to the actuated switch position for the first command articles dispensing position, thus measuring electrically the distance traversed by the conveyor C between the first and second article dispensing positions.

In the same manner as previously discussed, when the conveyor C and carriage G move into the bin opening of bin Z, the conveyor drive motor $k$ and carriage drive motor $s$ are sequentially energized by relays 1M Slow and 2M Slow, respectively, into slow speed and then de-energized when the said conveyor C and carriage G are centered within the opening of said bin Z preparatory to dispensing the article at said second position, However, as will now be realized, when the conveyor C moves in a reverse direction along the aisle E, the selected pair of proximity switches LS2, LS3 trade their control functions with each other so that the switch LS3 provides the horizontal count in the reverse direction of conveyor travel while switch LS2 controls the energizaton of the conveyor motor $k$.

As is also previously indicated, in the present dispensing cycle, an article is to be removed from the bin Z. Consequently, as the carriage G approaches its operative position in the opening of bin Z, the limit switches 11LS (FIG. 9E, line 49) and 8LSL (FIG. 9E, line 50) are actuated to de-energize the relays 2M Down and 2M Slow effective to stop the carriage travel at such a position that the carriage table 102 is a predetermined distance below the article supporting pallet as, for example, 1" below said pallet. In this manner, as the table 102 is extended into the bin Z, it may be thereafter raised to lift the pallet off the bin angles preparatory to removing the same from said bin.

As will now be realized, the control circuit as herein described is capable of directing the movement of the conveyor C and carriage G to two article dispensing positions in the storage area without said conveyor C returning to the load and discharge station before its conveyance to said second dispensing position.

In the event the second article dispensing position is located at the same bin position as the bin representing the first dispensing position whereby the conveyor C remains at said first position, the coils of relays 13CR and 14CR (FIG. 9G) are both energized when the stepping switches 1SRU and 1SRT count out the first command position therefor. The energization of relay 14CR energizes the coil of relay 15CR (FIG. 9G) whereby to retain the conveyor C in the same position. The carriage G meanwhile is moveably in the manner previously discussed to the second bin representing the second article dispensing position.

In the event the second article dispensing position is located at the same bin level as the first position, whereby the carriage G is not re-positioned vertically, the coils of relays 16CR and 17CR (FIG. 9H) are energized whereby to energize relay coil 18CR which is then locked in by its series contact (FIG. 9H).

The energization of relay 18CR retains the carriage G at the same level that it was previously moved to. The conveyor C thence moves to locate the carriage G at the second article dispensing position.

Still another feature in the control circuit of the present invention relates to its ability to automatically return the conveyor C to the load and discharge station when it is attempted to store a load in a bin already containing a load.

To accomplish this, it will be recalled that the limit switches 15LSR and 15LSL (FIG. 6) are carried on opposite ends of the table 102.

With this assembly, as the table 102 carrying a load is extended toward a bin already containing a load, either limit switch, depending upon the direction of the table 102 is extended, is actuated by the stored load whereby relays 4CR, 2TR, 5CR or 10CR (FIG. 9B) are de-energized, and the table 102 returns to its retracted position. Thereafter, the conveyor C and carriage G are automatically returned to the load and discharge station in the manner previously described.

A still additional novel feature of the control circuit of the present invention lies in its ability to retrieve a load from a predetermined bin in the storage area and carry it to the load and discharge station and then to send the load back to the bin from which it was extracted. This operational feature is especially desirable when only a part of the retrieved load is wanted and the remainder is to be stored until further needed, this retrieval concept being known in the art as "order picking."

To accomplish this, and with reference directed to FIGS. 9B, 9C, 9G and 9H, there is herein shown in schematic form a ten-switch selector of conventional assembly as is indicated at SS1, hereinbefore also referred to as the Cross-Over switch. Each of said switch positions is seen to comprise a normally closed switch $a$ position and a normally open switch position $b$.

As seen in FIGS. 9B and 9C, two of said switch positions ($n_1$, $n_2$–$p_1$, $p_2$) interconnect the first command and second command switches 58 and 59, respectively, such that with the switch position $n_1$ closed, the relay contact 5CR (FIG. 9B, line 20) is connected to the second command switch 59 and the contact 10CR (FIG. 9C, line 22) is connected to the first command switch 58.

In like manner, four switch positions of selector SS1 ($a_1$, $a_2$–$d_1$, $d_2$) are seen to interconnect the first and second horizontal command switch banks 148 and 149. Specifically, as seen in FIG. 9G, two of said normally closed switch positions ($a_1$, $a_2$–$b_1$, $b_2$) serially connect the coil of relay 13CR across the Units and Tens rows of the first horizontal command switch bank 148 and an additional two of said switch positions ($c_1$, $c_2$, $d_1$, $d_2$) similarly connect the coil of relay 14CR across the Units and Tens rows of the second horizontal command switch bank 149.

Relay coils 16CR and 17CR are also seen to be similarly connected across the Units and Tens rows of switches in the first and second vertical command switch banks 150 and 151, respectively, by switch contacts ($e_1$, $e_2$–$h_1$, $h_2$).

The switch positions connect serially with coil 13CR are seen to be interconnected with the switch positions connected serially with coil 14CR such that with the switch positions thereof closed as indicated in FIG. 9G, the relay coil 13CR is connected between the Units and Tens rows of switches in the second horizontal command switch bank 149 and the relay coil 14CR is connected between the Units and Tens rows of switches in the first horizontal command switch bank 148.

In like manner, with the switch positions ($e_1$, $e_2$–$g_1$, $g_2$, $h_1$, $h_2$) serially connected with relay coil 16CR and 17CR and interconnected in the manner shown in FIG. 9H, the relay coil 16CR is connected between the Units and Tens row of switches in the second command vertical switch bank 151, and relay coil 17CR is connected between the Units and Tens row of switches in the first command vertical switch bank 150.

With this assembly and assuming that it is desired to "order pick" from the load retrieved from the second dispensing position, the two command retrieving cycle is set up and carried out in the same manner as previously described whereby the load is returned to the load and discharge station for the conveyor C.

The portion of the load wanted at this time is removed by the operator and the Cross-Over switch SS1 is actuated so as to close the normally-open switch contacts thereof.

In this manner, the horizontal and vertical second command switch banks 149 and 151 are connected through the cross-over switch SS1 into the first command control circuitry through relays 13CR and 16CR and conversely, the horizontal and vertical first command switch banks 148 and 150 are connected into the second command control circuitry through relays 14CR and 17CR.

Thereafter, the cycle start push-button switch 52 and the Discharge push-button may be depressed to initiate another two command dispensing cycle. The conveyor C and carriage G will then be returned to the bin from which the previous load was removed, in the manner as is previously described the horizontal and vertical command switch banks 149 and 151 in this instance directing the conveyor C and carriage G to said bin and thereby operating as the first command switch bank.

The horizontal and vertical switch banks 148 and 150 may also be re-actuated at the time along with the Cycle-Start push button to set up a second article dispensing position for the same two command dispensing cycle whereby said switch banks 148 and 150 function as the second command switch bank.

Thereafter, if it is again desired to "order pick" the load removed from the bin at the conclusion of the second command dispensing cycle, the Cross-Over selector SS1 may be operated to return the switch contacts thereof to their normally-closed position as shown in FIGS. 9G and 9H. In this manner, the switch banks 148 and 150 operate in the normal manner as previously indicated to control the first command dispensing cycle and the switch banks 149 and 151 to control the second command dispensing cycle.

Having thus described my invention it will be understood that it is susceptible to various modifications and combinations of components without departing from the inventive concepts as are defined in the claims.

What is claimed is:

1. In a conveying and storage system for handling loads into and from a plurality of storage bins disposed in a predetermined number of columns in at least one storage bay to thereby define a plurality of rows of bins disposed at predetermined levels, said system including a conveyor movable in a first direction from a starting position, and along said bay selectively to each said bin column and a load carriage movable on said conveyor in a second direction along said bay to each said bin row; electrical control means for automatically controlling from said starting position the movement of said conveyor and carriage through a load handling cycle in said bay sequentially to at least two storage bins in said bay comprising, motive means for moving said conveyor and said carriage, circuit means connected to said motive means, control means in said circuit means for energizing said motive means effective to initiate the movement of said conveyor and carriage along said bay, first switch means in said circuit means being selectively actuated to define each bin column to which said conveyor is to move during said handling cycle, second switch means in said circuit means being selectively actuated to define the bin in each said bin column to which said carriage is to move during said handling cycle, the actuated first and second switch means thereby defining each of the two storage bins to which said conveyor and carriage are to move during said load handling cycle, first sensor means coacting with said conveyor to provide a signal when said conveyor moves in said first direction to a bin column, second sensor means coacting with said carriage to provide a signal when said carriage moves in said second direction to a bin row, said first sensor means comprising at least one pair of spaced sensors spaced generally horizontally with respect to one another in the direction of extension of said storage bay and coacting with one another for causing said conveyor to stop at the selected bin positions, the actuated first switch means being responsive to a predetermined signal from said first sensor means to actuate said control means and de-energize said motive means to stop said conveyor sequentially at each said bin column containing said two storage bins, the actuated second switch means being responsive to a predetermined signal from said second sensor means to actuate said control means and deenergize said motive means to stop said carriage sequentially in said bin columns at each said storage bins, load supporting means including motive means therefor on said carriage, said load supporting means being movable into and out of each bin at each said load handling position by the last mentioned motive means and selectively operable to remove from and deposit a load into each of said bins, said circuit means including means actuated by the load supporting means handling a load selectively into and from the first bin in said cycle to automatically re-energize said motive means for said conveyor and said carriage and initiate the movement of said conveyor and carriage to the next storage bin in the load handling cycle, said motive means for said conveyor comprising an electric motor having a high speed drive, a low speed drive, a coasting setting and a brake, said control means including motor control devices responsive to said spaced sensors to change said motor sequentially from said high speed drive to said low speed drive and then from said low speed drive to said coasting setting during approach of said conveyor to a selected bin column, and to apply said brake when said load supporting means is in generally centered alignment with said selected bin column.

2. In a conveying and storage system for handling loads into and from a plurality of storage bins disposed in a tiered arrangement in at least one storage bay, said storage bay including vertically spaced storage zones, said system including a conveyor movable in a first horizontal direction along said bay and a load carriage movable on said conveyor in a second vertical direction along said bay, electrical means for automatically controlling from a starting position the movement of said conveyor and carriage through a load handling cycle in said bay sequentially to at least two load handling positions in said bay comprising, motive means for moving said conveyor and said carriage, circuit means connected to said motive means, control means in said circuit means for energizing said motive means effective to initiate the movement of said conveyor and carriage along said bay, switch means in said circuit means for each of said storage bins in said bay being adapted for selective actuation to define the load handling positions to which said conveyor and carriage are to move during said cycle, sensor means coacting with said conveyor and carriage and being operable to provide a signal each time said conveyor and carriage move to a bin opening in said storage bay, said storage bay being comprised of magnetizable material at bin openings along said bay and said sensor means including proximity switches that are actuatable into conduction in response to being moved into relatively close relation to said magnetizable material, said switch means being connected in circuit with said control means and said sensor means, and operable with said sensor means to define counting means for said conveyor and carriage, the actuated switch means being responsive to a signal from said sensor means as said conveyor and carriage move to the bin of each of said load handling positions identified by actuation of said switch means effective to actuate said control means and deenergize said motive means and stop said conveyor and carriage sequentially at each of said load handling positions, load supporting means on said carriage being movable into and out of each bin at each of said load handling positions and selectively operable to remove from and deposit a load into each of the last-mentioned bins, said circuit means including means responsive to the load supporting means moving into and out of a bin when handling a load selectively relative to the first bin in said cycle to automatically re-energize said motive means and initiate the movement of said conveyor and carriage to the next load handling position in said bay, and wherein said sensor means includes a plurality of said proximity switches disposed in generally vertically spaced relation along said horizontally movable conveyor, each of said proximity switches coacting with a respective of said storage zones, and means for selectively connecting said proximity switches into circuit with said control means and said switch means, only one of said vertically spaced proximity switches being operative during movement of said conveyor and carriage to each load handling position in said cycle.

3. In a conveying and storage system for handling loads into and from a plurality of storage bins disposed in a predetermined number of columns in at least one storage bay to thereby define a plurality of rows of bins disposed at predetermined levels, said system including a conveyor movable in a first direction along said bay selectively to each said bin column and a load carriage movable on said conveyor in a second direction along said bay to each said bin row, electrical control means for automatically controlling from a load and discharge station the movement of said conveyor and carriage from said station through a load handling cycle in said bay sequentially to two storage bins in said bay comprising, motive means for moving said conveyor and said carriage, circuit means connected to said motive means, control means in said circuit means for energizing said motive means effective to initiate the movement of said conveyor and carriage along said bay, first switch means in said circuit means being selectively actuated to identify the first bin column to which said conveyor is to move during said handling cycle, second switch means in said circuit means selectively actuated to identify the bin in said first bin column to which said carriage is to move during said handling cycle, the actuated first and second switch means thereby identifying the first storage bin in said handling cycle, third switch means in said circuit means being selectively actuated to identify the second bin column to which said conveyor is moved during said handling cycle, fourth switch means in said circuit means being selectively actuated to identify the bin in said second bin column to which said carriage is to move during said handling cycle, the actuated third and fourth switch means thereby identifying the second storage bin in said handling cycle, first sensor means responsive to the movement of said conveyor to provide a signal each time said conveyor moves to a bin column, second sensor means responsive to the movement of said carriage to provide a signal each time said carriage moves to a bin row, first stepping switch means connecting each of said first and third switch means with said first sensor means, second stepping switch means connecting each of said second and fourth switch means with said second sensor means, said first stepping switch means being actuated in step fashion as said conveyor moves along said bay by a predetermined number of signals from said first sensor means and into conductive condition with the actuated first switch means, effective to actuate said control means and deenergize said motive means to stop said conveyor at said first bin column, said second stepping switch means being actuated in step fashion as said carriage moves along said bay by a predetermined number of signals from said second sensor means and into conductive condition with the actuated second switch means, effective to actuate said control means and deenergize said motive means so as to stop said carriage at said first bin in said first bin column, load supporting means on said carriage being movable into and out of said first bin and selectively operable to remove from and deposit a load into said bins, said circuit means including means responsive to the load supporting means handling a load selectively into and from said first bin to automatically re-energize said motive means and initiate the movement of said conveyor and carriage to the next storage bin in the load handling cycle, said first stepping switch means being reactuated by said first sensor means in step fashion as said conveyor moves along said bay and into conductive condition with the actuated third switch means, effective to actuate said control means and deenergize said motive means to stop said conveyor at the second bin column, said second stepping switch means being reactuated by said second sensor means in step fashion as said carriage moves along said bay and into conductive condition with the actuated fourth switch means, effective to actuate said control means and deenergize said motive means so as to stop said carriage at the second selected bin in said second bin column, said load supporting means being movable into and out of said second bin and selectively operable to remove from and deposit a load into said second bin, said circuit means including means responsive to the load supporting means handling a load selectively into and from said second bin and to automatically re-enregize said motive means and initiate the return movement of said conveyor and carriage to said load and discharge station, and wherein said first sensor means comprises a plurality of magnetically responsive switch means carried on the conveyor in spaced relation to each other and which are selectively actuated to sense the movement of the conveyor along said storage bay.

4. In a conveying and storage system for handling loads into and from a plurality of storage bins disposed in a predetermined number of columns in at least one storage bay to thereby define a plurality of rows of bins disposed at predetermined levels, said system including a conveyor movable in a first direction along said bay selectively to each said bin column and a load carriage movable on said conveyor and in a second direction along said bay to each said bin row, electrical control means for automatically controlling from a load and discharge station the movement of said conveyor and carriage from said station through a load handling cycle in said bay sequentially to two storage bins in said bay comprising, motive means for moving said conveyor and said carriage, circuit means connected to said motive means, control means in said circuit means for energizing said motive means effective to initiate the movement of said conveyor and carriage along said bay, first switch means in said circuit means being selectively actuated to identify the first bin column to which said conveyor is to move during said handling cycle, second switch means in said circuit means being selectively actuated to identify the bin in said first bin column to which said carriage is to move during said handling cycle, the actuated first and second switch means thereby identifying the first storage bin in said handling cycle, third switch means in said circuit means being selectively actuated to identify the second bin column to which said conveyor is moved during said handling cycle, fourth switch means in said circuit means being selectively actuated to identify the bin in said second bin column to which said carriage is to move during said handling cycle, the actuated third and fourth switch means thereby identifying the second storage bin in said handling cycle, first sensor means responsive to the movement of said conveyor to provide a signal each time said conveyor moves to a bin column, second sensor means responsive to the movement of said carriage to provide a signal each time said carriage moves to a bin row, first stepping switch means connecting each of said first and third switch means with said first sensor means, second stepping switch means connecting each of said second and fourth switch means with said second sensor means, said first stepping switch means being actuated in step fashion as said conveyor moves along said bay by a predetermined number of signals from said first sensor means and into conductive condition with the actuated first switch means, effective to actuate said control means and deenergize said motor means to stop said conveyor at said first bin column, said second stepping switch means being actuated in step fashion as said carriage moves along said bay by a predetermined number of signals from said second sensor means and into conductive condition with the actuated second switch means, effective to actuate said control means and deenergize said motive means so as to stop said carriage at said first bin in said first bin column, load supporting means on said carriage being movable into and out of said first bin and selectively operable to remove from and deposit a load into said bin, said circuit means including means responsive to the load supporting means handling a load selectively into and from said first bin to automatically re-energize said motive means and initiate the movement of said conveyor and carriage to the next storage bin in load handling cycle, said first stepping switch means being reactuated by said first sensor means in step fashion as said conveyor moves along said bay and into conductve condition with the actuated third switch means, effective to actuate said control means and deenergize said motive means to stop said conveyor at the second bin column, said second stepping switch means being reactuated by said second sensor means in step fashion as said carriage moves along said bay and into conductive condition with the actuated fourth switch means effective to actuate said control means and deenergize said motive means so as to stop said carriage at the second selected bin in said second bin column, said load supporting means being movable into and out of said second bin and selectively operable to remove from and deposit a load into said second bin, and said circuit means including means responsive to the load supporting means handling a load selectively into and from said second bin to automatically re-energize said motive means and initiate the return movement of said conveyor and carriage to said load and discharge station, and wherein the storage bay is divided into a plurality of bay zones each having a predetermined number of storage bays at preselected levels and the first sensor means comprising a plurality of magnetically responsive switch means each of which is carried on said conveyor so as to be carried in one of said bay zones and selectively actuated to sense the movement of said conveyor along said storage bay.

5. In a conveying and storage system for handling loads into and from a plurality of storage bins disposed in a predetermined number of columns in at least one storage bay to thereby define a plurality of rows of bins disposed at predetermined levels, said system including a conveyor movable in a first generally horizontal direction along said bay selectively to each said bin column, a load carriage movable on said conveyor in a second generally vertical direction along said bay to each said bin row, load supporting means on said carriage movable out of the latter and into and out of a selected bin to handle loads into and from said bins, electrical means for automatically controlling the movement of said conveyor, carriage and load supporting means through a load-handling cycle in said bay, said storage bay being comprised of a plurality of vertically spaced bay zones each having a predetermined number of storage bins at preselected levels, motive means for moving said conveyor, said carriage and said load supporting means, circuit means connected to said motive means, said circuit means comprising control means for said motive means including a plurality of vertically spaced pairs of sensor means coacting with said conveyor to sense the movement of said conveyor along said storage bay zones, each of said pairs of sensor means coacting with a respective of said bay zones, means in each bay zone to which the respective pair of sensor means are responsive for actuating said sensor means, and means for selectively connecting each of said pairs of sensor means into circuit with said control means whereby only one of said pairs of sensor means is operative during movement of said conveyor and carriage to each load handling position in said bay.

6. In a conveying and storage system for handling loads into and from a plurality of storage bins disposed in a predetermined number of columns in at least one storage bay to thereby define a plurality of rows of bins disposed at predetermined levels, said system including a load carrier comprising a conveyor movable in first generally horizontal directions and along said bay and a load carriage movable on said conveyor in second generally vertical directions and along said bay, electrical control means providing for first and second commands for automatically controlling from a starting position the movement of said conveyor and carriage through a load handling cycle in said bay which comprises moving said conveyor and carriage sequentially to a first load handling position defined by a storage bin in said bay, thence to a second load handling position defined by a storage bin, thence returning said conveyor and carriage to said starting position, and thereafter moving said conveyor and carriage back to said second load handling position comprising, motive means for moving said conveyor and said carriage, circuit means connected to said motive means, control means in said circuit means for energizing and deenergizing said motive means and effective to initiate the movement of said conveyor and said carriage along said bay, other control means in said circuit means adapted for actuating to define the load handling positions to which said conveyor and said carriage will move during said handling cycle, said other control means being effective to actuate said motive control means and deenergize said motive means to stop said conveyor and said carriage at the selected bin in said handling cycle, said other control means including first selector means in said circuit means being selectively actuated to identify the first bin column to which said conveyor is to move during said handling cycle, second selector means in said circuit means selectively actuated to identify the bin in said first bin column to which said carriage is to move during said handling cycle, the actuated first and second selector means thereby identifying the first storage bin in said handling cycle, third selector means in said circuit means being selectively actuated to identify the second bin column to which said conveyor is moved during said handling cycle, fourth selector means in said circuit means being selectively actuated to identify the bin in said second bin column to which said carriage is to move during said handling cycle, the actuated third and fourth selector means thereby identifying the second storage bin in said handling cycle, first command control means for controlling the movement of said conveyor and said carriage to said first bin, second command control means for controlling the movement of said conveyor and said carriage to said second bin, first coupling means connecting each of said first and second selector means with said first command control means, second coupling means connecting each of said third and fourth selector means with said second command control means, load supporting means on said carriage being movable into and out of said bins and operable to place a load into and to remove a load from the same, said circuit means including switch means responsive to the load supporting means handling a load from the second of said bins in said cycle to automatically re-energize said motive means and initiate the return movement of said conveyor and carriage to said starting position whereby a part of the load may be withdrawn from said load supporting means, and cross over switch means coacting with said coupling means for selectively coupling said third and fourth selector means into said first command control means and for selectively coupling said first and second selector means into said second command control means for thereafter actuating said circuit means to return and deposit the part of the load remaining on said load supporting means back into said second bin without actuation of said third and fourth selector means.

7. In a conveying and storage system for handling loads into and from a plurality of storage bins disposed along a bay in vertical columns and in rows at different levels in said columns and including conveying means movable in longitudinal and vertical directions in a path to a selected bin in a given column and to a given row in said column, load supporting means on said conveying means movable laterally out of said path and into and out of a selected bin to handle loads into and from said bins, power means operatively connected with said conveying means and load supporting means for moving the latter to handle loads into and from said bins, control means for said power means including selector devices operable to cause an automatic cycle of said conveying means and load supporting means to move from a starting position to a predetermined column and to a predetermined row in said column at a selected bin and to there handle a load relative to said bin, the improvement wherein said power means for said conveying means is an electrical motor having a high speed drive and a low speed drive and a coasting setting and a brake, said control means includes first and second longitudinally spaced column indicating means, and motor control devices responsive to said selector devices and to said column indicating means to change said motor sequentially from said high speed drive to said low speed drive and then from said low speed drive to said coasting setting during approach of said conveying means to a preselected column of bins and to apply said brake upon reaching said preselected column, said first column indicating means being operative to change said motor from said high speed to low speed upon movement of said conveyor means in a longitudinal direction by the approach side of said preselected column, and said second colum indicating means being operable to change said motor from said low speed to coast and then to cause application of said brake during movement of said load supporting means on said longitudinally moving conveyor means into generally centered alignment with said preselected column.

8. A conveying and storage system in accordance with claim 7 wherein said control means include means operatively coupled to said spaced column indicating means and responsive thereto to enable the operation of said load supporting means into and out of said selected bin only when said load supporting means is in generally centered alignment with said preselected bin column.

9. In a conveying and storage system for handling loads into and from a plurality of storage bins disposed along a bay in vertical columns and in rows at different levels in said columns and including conveying means movable in a path to a selected bin in a given column and to a given row in said column, said conveying means comprising a generally upstanding longitudinally movable conveyor portion and an elevator portion mounted for vertical movement on said conveyor portion, load supporting means on said elevator portion movable laterally out of said path and into and out of a selected bin to handle loads into and from said bins, power means operatively connected with said conveying means and load supporting means for moving the latter to handle loads into and from said bins, control means for said power means including selector devices operable to cause an automatic cycle of said conveying means and load supporting means to move to a predetermined column and to a predetermined row in said column at a selected bin and to there handle a load relative to said bin, and wherein said bins have load supporting members, and said load supporting means moves verticaly in a restricted zone adjacent said load supporting members between a high load engaging level and a low level free of said load and which moves downwardly when depositing a load and upwardly when picking up a load; the improvement comprising vertically spaced sensor means on said elevator portion and actuating means on said conveyor portion for said sensor means, said actuating means comprising vertically spaced actuators on said conveyor portion oriented therealong in spaced conformity with said rows in said columns, said sensor means being in circuit with said power means for said laterally movable load supporting means, said sensor means defining respectively the upper and lower limits of vertical movement of said load supporting means in said zone, and safety means coacting with said control means and permitting movement of said load supporting means laterally out of said path and into a bin in said restricted zone only, said safety means comprising a sensor mounted on said elevator portion and disposed in circuit with said power means for said laterally movable load supporting means, and vertically spaced actuator means on said conveyor portion for the last mentioned sensor, spaced along said conveyor portion in conformity with said rows in said columns.

10. A conveying and storage system in accordance with claim 9 including means coacting with said power means for said laterally movable load supporting means and with said power means for said elevator portion permitting movement of said load supporting means vertically in said restricted zone when picking up a load or depositing a load at said selected bin only when said load supporting means is extended a predetermined amount into said selected bin.

11. In a conveying and storage system for handling loads into and from a plurality of storage bins disposed along opposing bays in vertical columns and in rows at different levels in said columns, each of said bays including vertically spaced storage zones, said system including conveying means movable in a path to a selected bin in a given column and in a given row in said column, load supporting means on said conveying means movable out of said path and into and out of a selected bin to handle loads into and from said bins, power means operatively connected with said conveying means and load supporting means for moving the latter to handle loads into and from said bins, control means for said power means including selector devices operable to cause an automatic cycle of said conveying means and load supporting means to move to a predetermined column and to a predetermined row in said column at a selected bin and to there handle a load relative to a bin; the improvement comprising vertically spaced sensing devices on said conveying means for each of said bays, each of said sensing devices coacting with a respective of said storage zones, means in each storage zone to which the respective of said sensing devices is responsive for actuating said sensing devices, and means for selectively connecting into circuit with said selector devices only one of said sensing devices for the respective bay depending upon whether a load is to be handled at a higher or at a lower one of said storage zones in the selected bay, whereby to accurately position said conveying means at a selected column of bins even though said selected column of bins is not truly vertical or the columns of bins in said opposing bays are not opposite each other, the other of said vertically spaced sensing devices for the selected bay being inoperative during movement of said conveying means and load supporting means to the selected bin in the selected storage zone.

References Cited

UNITED STATES PATENTS

| | | | |
|---|---|---|---|
| 2,988,237 | 6/1961 | Devol | 214—16.4 |
| 3,139,994 | 7/1964 | Chasar | 214—16.4 |
| 3,223,200 | 12/1965 | Lejeune | 187—29 |
| 3,232,455 | 2/1966 | Fountain et al. | 214—16.4 |
| 3,272,347 | 9/1966 | Lemelson | 214—16.4 |

GERALD M. FORLENZA, *Primary Examiner.*

R. B. JOHNSON, *Assistant Examiner.*